(12) United States Patent
Lee et al.

(10) Patent No.: US 9,207,359 B2
(45) Date of Patent: Dec. 8, 2015

(54) POLARIZING FILM AND DISPLAY DEVICE INCLUDING THE POLARIZING FILM

(71) Applicant: SAMSUNG ELECTRONICS CO., LTD., Suwon-si, Gyeonggi-do (KR)

(72) Inventors: Yong Joo Lee, Suwon-si (KR); Deuk Kyu Moon, Seoul (KR); Sang Ho Park, Anyang-si (KR); Jong Hoon Won, Yongin-si (KR); Hyeon Ho Choi, Seoul (KR); Myung Man Kim, Suwon-si (KR); Young Hwan Kim, Seongnam-si (KR); Feifei Fang, Suwon-si (KR); Myung Sup Jung, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/073,510

(22) Filed: Nov. 6, 2013

(65) Prior Publication Data
US 2014/0131643 A1     May 15, 2014

Related U.S. Application Data

(63) Continuation-in-part of application No. 13/889,683, filed on May 8, 2013.

(30) Foreign Application Priority Data

Nov. 7, 2012    (KR) .................. 10-2012-0125682

(51) Int. Cl.
*F21V 9/14*        (2006.01)
*G02B 5/30*       (2006.01)
*G02C 7/12*       (2006.01)
(Continued)

(52) U.S. Cl.
CPC ............ *G02B 1/08* (2013.01); *B29D 11/00644* (2013.01); *C09B 31/043* (2013.01); *C09B 31/12* (2013.01); *C09B 31/14* (2013.01); *C09B 31/28* (2013.01); *C09B 33/00* (2013.01); *G02B 1/04* (2013.01); *G02B 5/3033* (2013.01)

(58) Field of Classification Search
USPC ............ 8/639, 664; 252/299.01, 586, 299.62, 252/585; 264/1.34; 349/96; 359/487.02, 359/489.19, 492.01, 485.01; 427/163.1; 428/1.1, 220; 534/575, 797, 811, 812, 534/831
See application file for complete search history.

(56) References Cited

U.S. PATENT DOCUMENTS

| | | |
|---|---|---|
| 2002/0128341 A1 | 9/2002 | Sakai et al. |
| 2004/0166250 A1 | 8/2004 | Sakai et al. |

(Continued)

FOREIGN PATENT DOCUMENTS

| | | | | |
|---|---|---|---|---|
| EP | 0348964 A2 | 6/1989 | | |
| FR | WO2011/157614 A1 * | 12/2011 | ............. | C09B 31/28 |

(Continued)

OTHER PUBLICATIONS

The Extended European Search Report for European Patent Application No. 13191763.5 dated Jan. 22, 2014.

(Continued)

*Primary Examiner* — Bijan Ahvazi
(74) *Attorney, Agent, or Firm* — Cantor Colburn LLP

(57) ABSTRACT

Disclosed are a polarizing film including a polyolefin and a dichroic dye having a solubility parameter difference between the polyolefin and the dichroic dye is less than 7.4, and a display device including the polarizing film.

32 Claims, 7 Drawing Sheets

(51) Int. Cl.
*G02B 1/08* (2006.01)
*B29D 11/00* (2006.01)
*C09B 33/00* (2006.01)
*G02B 1/04* (2006.01)
*C09B 31/043* (2006.01)
*C09B 31/12* (2006.01)
*C09B 31/14* (2006.01)
*C09B 31/28* (2006.01)
*B29D 7/01* (2006.01)
*G02F 1/1335* (2006.01)

(56) References Cited

U.S. PATENT DOCUMENTS

| | | | |
|---|---|---|---|
| 2011/0051052 A1 | 3/2011 | Tasaka et al. | |
| 2011/0075076 A1* | 3/2011 | Nishiguchi et al. | 349/96 |
| 2012/0050652 A1* | 3/2012 | Chang et al. | 349/96 |
| 2013/0092874 A1 | 4/2013 | Bacher et al. | |

FOREIGN PATENT DOCUMENTS

| | | |
|---|---|---|
| GB | 2255570 A | 11/1992 |
| JP | 2003096461 A | 4/2003 |
| JP | 2011046904 A | 3/2011 |
| JP | 2011048309 A | 3/2011 |
| JP | 2011048310 A | 3/2011 |
| JP | 2011048311 A | 3/2011 |
| KR | 100852224 B1 | 7/2002 |
| KR | 1020120021184 A | 3/2012 |
| WO | 2011157614 A1 | 12/2011 |

OTHER PUBLICATIONS

A.T. Slark, Application of the Kwei equation to the glass transition of dye solute-polymer blends, Polymer, 40, 1999, pp. 1935-1941.

D. Karst et al., Using the Solubility Parameter to Explain Disperse Dye Sorption on Polylactide, Journal of Applied Polymer Science, vol. 96, 2005, pp. 416-422.

JK Srivastava et al., Thermal and morphological studies of liquid crystalline materials dispersed in a polymer matrix, Liquid Crystals, vol. 38, No. 7, Jul. 2011, pp. 849-859.

M. Matsui et al., Synthesis of perfluorobutyl-substituted ester-disazo dyes and their application to guest-host liquid crystal displays, Liquid Crystals, vol. 29, No. 5, 2002, pp. 707-712.

R.F. Fedors, A Method for Estimating Both the Solubility Paramenters and Molar Volumes of Liquids, Polymer Engineering and Science, vol. 14, No. 2, Feb. 1974, pp. 147-154.

S. Darvishmanesh et al., Physicochemical Characterization of Solute Retention in Solvent Resistant Nanofiltration: the Effect of Solute Size, Polarity, Dipole Moment, and Solubility Parameter, The Journal of Physical Chemistry B, 115, 2011, pp. 14507-14517.

S.A. Siddiqui, Studies of Solvent Dyeing : Part I: Preparation of Disperse Dyes and Determination of Their Solubility Parameters, Textile Research Journal, 51, Aug. 1981, pp. 527-533.

* cited by examiner

POLARIZING FILM AND DISPLAY DEVICE INCLUDING THE POLARIZING FILM

CROSS-REFERENCE TO RELATED APPLICATION

This application is a continuation-in-part of U.S. patent application Ser. No. 13/889,683, filed May 8, 2013, which claims priority to and the benefit of Korean Patent Application No. 10-2012-0125682, filed on Nov. 7, 2012, and all the benefits accruing therefrom under 35 U.S.C. §119, the content of which is incorporated herein in its entirety by reference.

BACKGROUND

1. Field

A polarizing film and a display device including the polarizing film are disclosed.

2. Description of the Related Art

A display device such as a liquid crystal display ("LCD") and an organic light emitting diode ("OLED") includes a polarizing plate attached to the outside of the display panel. The polarizing plate only transmits light of a specific wavelength and absorbs or reflects other light, so it may control the direction of incident light on the display panel or light emitted from the display panel.

The polarizing plate generally includes a polarizer and a protective layer for the polarizer. The polarizer may be formed, for example, from polyvinyl alcohol ("PVA"), and the protective layer may be formed, for example, from triacetyl cellulose ("TAC").

However, a process of making the polarizing plate including the polarizer and the protective layer is complicated and expensive, and also results in a thick polarizing plate, which leads to an increased thickness of a display device. Accordingly, there remains a need in the art for a polarizing film that does not require a protective layer.

SUMMARY

An embodiment provides a polarizing film that may have improved polarization properties.

Another embodiment provides a display device including the polarizing film.

Yet another embodiment provides a composition for a polarizing film.

According to an embodiment, a polarizing film that includes a polyolefin and a dichroic dye represented by the following Chemical Formula 1 is provided, wherein a solubility parameter difference between the polyolefin and the dichroic dye is less than 7.4.

Chemical Formula 1

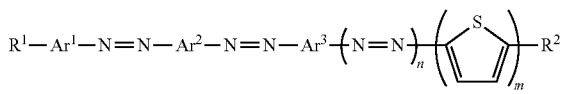

In Chemical Formula 1, $Ar^1$ to $Ar^3$ are each independently a substituted or unsubstituted C6 to C15 arylene group, $R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, or a combination thereof, $R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, a substituted or unsubstituted amino group, or a combination thereof, and n and m are independently 0 or 1.

$R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, a substituted or unsubstituted C1 to C20 alkoxy group, a substituted or unsubstituted C1 to C20 thioalkyl group, $-NR^3R^4$, or a combination thereof, wherein $R^3$ and $R^4$ may be independently hydrogen, a substituted or unsubstituted C1 to C10 alkyl group, or may be linked to each other to form a ring.

When each of n and m is 1, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, $-NR^3R^4$, or a combination thereof, wherein $R^3$ and $R^4$ may be independently hydrogen, a substituted or unsubstituted C1 to C10 alkyl group, or may be linked to each other to form a ring.

When each of n and m is 0, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, $-NR^3R^4$, or a combination thereof, wherein $R^3$ and $R^4$ may be independently hydrogen, a substituted or unsubstituted C1 to C10 alkyl group, or may be linked to each other to form a ring.

When n is 1 and m is 0, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C30 aryl group, $-NR^3R^4$, or a combination thereof, wherein $R^3$ and $R^4$ may be independently hydrogen, a substituted or unsubstituted C1 to C10 alkyl group or may be linked to each other to form a ring.

$R^2$ may include a substituted or unsubstituted C6 to C30 aryl group.

Ar$^1$ to Ar$^3$ may each independently include a substituted or unsubstituted phenylene group, a substituted or unsubstituted naphthalene group, or a substituted or unsubstituted biphenylene group.

The substituted phenylene group, the substituted naphthalene group, and the substituted biphenylene group may be substituted with a substituted or unsubstituted C1 to C20 alkyl group, a substituted or unsubstituted C1 to C20 alkoxy group, a halogen atom, a halogen-containing group, or a combination thereof.

The polyolefin may have a solubility parameter of about 15 to about 18, and the dichroic dye may have a solubility parameter of less than about 24.

The polyolefin may include polyethylene (PE), polypropylene (PP), a polyethylene-polypropylene copolymer, or a combination thereof.

The polyolefin may be a combination comprising polypropylene (PP) and a polyethylene-polypropylene copolymer (PE-PP), wherein the polyethylene-polypropylene copolymer (PE-PP) may have an ethylene content of about 1 to about 50 wt %.

The polyolefin may have a melt flow index (MFI) of about 1 g/10 min to about 15 g/10 min.

The dichroic dye may be present in an amount of about 0.01 to about 5 parts by weight based on 100 parts by weight of the polyolefin resin.

The dichroic dye may be present in an amount of about 0.05 to about 1 part by weight based on 100 parts by weight of the polyolefin resin.

The polarizing film may have a dichroic ratio of about 3 to about 10 in a visible ray wavelength region of about 380 nm to about 780 nm.

The polarizing film may be a melt-blend of the polyolefin and dichroic dye.

The dichroic dye may be dispersed in the polyolefin resin, and the polyolefin may be elongated in a uniaxial direction by about 400 to about 1000%.

A method of manufacture of a polarizing film includes melt-blending the composition including a polyolefin and a dichroic dye as described above; forming a sheet from the melt-blended composition; and elongating the sheet in a uniaxial direction to provide the polarizing film.

According to another embodiment, a display device including the polarizing film is provided.

According to yet another embodiment, a composition for a polarizing film includes a polyolefin and the dichroic dye represented by the above Chemical Formula 1, wherein a solubility parameter difference between the polyolefin and dichroic dye is less than 7.4.

The polyolefin may have a melting point (Tm) of less than or equal to about 300° C.

The polyolefin may be a combination comprising polypropylene (PP) and a polyethylene-polypropylene copolymer (PE-PP).

The polyolefin may have a melt flow index (MFI) of about 1 g/10 min to about 15 g/10 min.

The polypropylene (PP) may have a melt flow index (MFI) of about 0.1 g/10 min to about 5 g/10 min, and the polyethylene-polypropylene copolymer (PE-PP) may have a melt flow index (MFI) of about 5 g/10 min to about 15 g/10 min.

The composition for a polarizing film may have a solid content of greater than or equal to about 90 wt %.

In an embodiment, the composition for a polarizing film does not include a solvent.

In another embodiment, a polarizing film includes a transparent polymer having a melting point of higher than or equal to about 130° C., and a dichroic dye represented by the Chemical Formula 1, wherein a solubility parameter difference between the dichroic dye and the polyolefin, the polyethylene terephthalate or a combination thereof is less than 7.4.

BRIEF DESCRIPTION OF THE DRAWINGS

These and other embodiments will become apparent and more readily appreciated from the following description taken in conjunction with the accompanying drawings in which.

DETAILED DESCRIPTION

Figure 1:
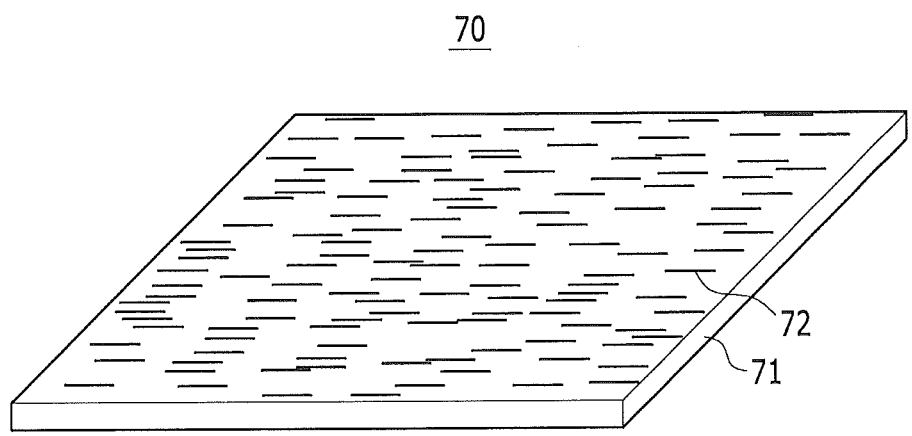
FIG. 1 is schematic view of a polarizing film according to an embodiment.

This disclosure will be described more fully hereinafter with reference to the accompanying drawings, in which exemplary embodiments of the present disclosure are shown. This disclosure may, however, be embodied in many different forms and should not be construed as limited to the exemplary embodiments set forth herein.

It will be understood that when an element is referred to as being "on" another element, it can be directly on the other element or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term "substituted" refers to a compound or group substituted with at least one substituent selected from a halogen (F, Br, Cl, or I), a C1 to C20 alkoxy group, a cyano group, an amino group, a C1 to C20 ester group, a C1 to C20 alkyl group, a C1 to C20 aryl group, a C2 to C20 alkenyl group, a C2 to C20 alkynyl group, and a combination thereof, in place of at least one hydrogen of the compound or group.

The term "aryl" refers to a hydrocarbon group having an aromatic ring, and includes monocyclic and polycyclic hydrocarbons wherein the additional ring(s) of the polycyclic hydrocarbon may be aromatic.

The term "aromatic" refers to a hydrocarbon group having a ring or ring system containing alternating double and single bonds between carbon atoms forming the ring or ring system, and includes monocyclic and polycyclic hydrocarbons wherein the additional ring(s) of the polycyclic hydrocarbon may be aromatic or nonaromatic. Any additional rings may be fused, pendant, spirocyclic, or a combination thereof.

The term "heteroaromatic" refers to an aromatic group as defined above and having at least one (e.g., 1 to 3) ring carbon atoms replaced by a heteroatom such as oxygen, nitrogen, phosphorus, and sulfur. Examples of heteroaromatic groups include furyl and pyridyl.

The term "aliphatic" refers to a hydrocarbon group that is not aromatic and includes straight chains, branched chains, and non-aromatic rings. An aliphatic group can be saturated or unsaturated.

The term "heteroaliphatic" refers to an aliphatic group that comprises at least one (e.g., 1 to 3) heteroatoms covalently bonded to one or more carbon atoms of the aliphatic group. Each heteroatom is independently chosen from nitrogen (N), oxygen (O), sulfur (S), and phosphorus (P).

The term "alkyl" refers to a straight or branched chain, saturated monovalent hydrocarbon group.

The term "alkoxy" refers to an alkyl group that is linked via an oxygen (i.e., —O-alkyl). Nonlimiting examples of C1 to C20 alkoxy groups include methoxy groups, ethoxy groups, propoxy groups, isobutyloxy groups, sec-butyloxy groups, pentyloxy groups, iso-amyloxy groups, and hexyloxy groups.

The term "thioalkyl" refers to an alkyl group that is linked via a sulfur (i.e., —S-alkyl).

The term "ketone" refers to a group having the structure of —$R_1C(=O)R_2$—, wherein $R_1$ and $R_2$ are independently C1-C20 aliphatic groups.

The term "oxycarbonyl" refers to a group having the structure of $R_3OC(=O)$—, wherein $R_3$ is a C1 to C20 hydrocarbon group.

The term "alkenyl" refers to a straight or branched chain, monovalent hydrocarbon group having at least one carbon-carbon double bond (e.g., ethenyl (—HC=$CH_2$)).

The term "alkynyl" refers to a straight or branched chain, monovalent hydrocarbon group having at least one carbon-carbon triple bond (e.g., ethynyl).

Hereinafter, a polarizing film according to an embodiment is described.

FIG. 1 is schematic view of a polarizing film according to an embodiment.

Referring to FIG. 1, a polarizing film 70 according to an embodiment includes a polyolefin 71 and a dichroic dye 72.

The polyolefin 71 may be any polyolefin, provided that a solubility parameter difference between the polyolefin and the dichroic dye of Chemical Formula 1 is less than 7.4. Polyolefins are a polymer of one or more monomers containing ethylenic unsaturation, for example a monoolefin such as a straight or branched chain compound having a terminal ethylenic double bond and containing less than six carbon atoms. In an embodiment, the monoolefin contains two or three carbon atoms, i.e., ethylene and propylene. The monomer may be halogenated, an in particular may contain chlorine, fluorine, or a combination thereof. For example, the monomer may be a fluorinated monomer such as a perfluorinated monoolefin, for example hexafluoropropylene or tetrafluoroethylene, or a partially fluorinated monoolefin which may contain other substituents, e.g., chlorine or perfluoroalkoxy, for example vinylidene fluoride, chlorotrifluoroethylene and perfluoroalkyl vinyl ethers in which the alkyl group contains up to six carbon atoms, e.g., perfluoro ethyl vinyl ether). A combination of halogenated and non-halogenated monomers may be used.

The polyolefin 71 may comprise, for example, polyethylene ("PE"), polypropylene ("PP"), a polyethylene-polypropylene copolymer ("PE-PP"), or a combination thereof.

The polyolefin 71 may be a combination comprising at least two of polyethylene (PE), polypropylene (PP), a polyethylene-polypropylene copolymer (PE-PP). For example, the polyolefin 71 may be a combination comprising polypropylene (PP) and a polyethylene-polypropylene copolymer (PE-PP).

As described above, the repeating units of polyethylene, polypropylene and polyethylene-polypropylene may be halogenated, for example, partially fluorinated or perfluorinated. In still another embodiment, a combination of a polyethylene terephthalate ("PET") and a polyolefin can be used in place of the polyolefin. Polyethylene terephthalate is a hydrophobic polymer having a solubility parameter of about 15 to about 21. The amount of polyethylene terephthalate (PET) is effective to provide the desired properties, as long as a solubility parameter difference between the combination of the polymers and the dichroic dye of Chemical Formula 1 is less than 7.4.

The polypropylene (PP) may have a melt flow index ("MFI") of, for example about 0.1 g/10 min to about 5 g/10 min. Herein, the melt flow index (MFI) denotes the amount of a melt polymer flowing down per 10 minutes and relates to viscosity of the melt polymer. In other words, the smaller melt flow index (MFI) a polymer has, the lower a viscosity it has.

When the polypropylene (PP) has a melt flow index (MFI) within the range, properties of a final product as well as workability may be effectively improved. The polypropylene (PP) may have a melt flow index (MFI) of about 0.5 g/10 min to about 5 g/10 min.

The polyethylene-polypropylene copolymer (PE-PP) may include about 1 wt % to about 50 wt % of an ethylene group based on the total amount of the polyethylene-polypropylene copolymer. When the polyethylene-polypropylene copolymer (PE-PP) has an ethylene group within the range, phase separation of the polypropylene (PP) and the polyethylene-polypropylene copolymer (PE-PP) may be effectively prevented or suppressed. In addition, an elongation rate may be increased, excellent light transmittance may be obtained, and arrangement may also be improved, accomplishing excellent polarization properties. Specifically, the polyethylene-polypropylene copolymer (PE-PP) may include an ethylene group ranging from about 1 wt % to about 25 wt %, about 1 wt % to about 20 wt %, about 1 wt % to about 15 wt %, from about 5 wt % to about 25 wt % based on the total amount of the polyethylene-polypropylene copolymer (PE-PP).

The polyethylene-polypropylene copolymer (PE-PP) may have a melt flow index (MFI) of about 5 g/10 min to about 15 g/10 min. When the polyethylene-polypropylene copolymer (PE-PP) has a melt flow index (MFI) within the range, a property of a final product as well as workability may be effectively improved. The polyethylene-polypropylene copolymer (PE-PP) may have a melt flow index (MFI) of about 10 g/10 min to about 15 g/10 min.

The polyolefin 71 may include the polypropylene (PP) and the polyethylene-polypropylene copolymer (PE-PP) at a weight ratio of about 1:9 to about 9:1. When the polypropylene (PP) and the polyethylene-polypropylene copolymer (PE-PP) are included within the range, not only excellent mechanical strength may be secured but crystallization of the polypropylene may also be prevented, effectively improving haze characteristics. Specifically, the polyolefin 71 may include the polypropylene (PP) and the polyethylene-polypropylene copolymer (PE-PP) in a weight ratio ranging from about 4:6 to about 6:4, and more specifically, about 5:5.

The polyolefin 71 may have a melt flow index (MFI) of about 1 g/10 min to about 15 g/10 min. When the polyolefin 71 has a melt flow index (MFI) within the range, crystals are not excessively formed in the resin. Accordingly, excellent light transmittance as well as appropriate viscosity for fabricating a film may be secured, improving workability. Specifically, the polyolefin 71 may have a melt flow index (MFI) of about 5 g/10 min to about 15 g/10 min.

The polyolefin 71 may have a haze of less than or equal to about 5%. When the polyolefin 71 has a haze within the range, transmittance is increased, securing excellent optical properties. Specifically, the polyolefin 71 may have a haze of less than or equal to about 2% and more specifically, ranging from about 0.5% to about 2%.

The polyolefin 71 may have crystallinity of less than or equal to about 50%. When the polyolefin 71 has crystallinity within the range, the haze of the polyolefin may be decreased, accomplishing excellent optical properties. Specifically, the polyolefin 71 may have crystallinity ranging from about 30% to about 50%.

The polyolefin 71 is elongated in one direction. The direction may be the same as the longitudinal direction of a dichroic dye 72.

The dichroic dye 72 is dispersed in the polyolefin 71 and arranged in the elongation direction of the polyolefin 71. The dichroic dye 72 may transmit one of two polarization perpendicular components in a predetermined wavelength region.

The dichroic dye 72 may be selected from compounds having a solubility parameter difference from the polyolefin 71 of less than or equal to 7.4. The solubility parameter illustrates an interaction degree to which two or more compounds interact. The smaller the solubility parameter difference the compounds have, the larger the interaction the compounds have therebetween, and the larger the solubility parameter difference the compounds have, the smaller the interaction the compounds have therebetween.

The solubility parameter relates to the structure of compounds. The dichroic dye 72 according to an embodiment has a solubility parameter difference with the polyolefin 71 of less than 7.4. Without wishing to be bound by theory, when the dichroic dye 72 and the polyolefin 71 have a solubility parameter difference within the range, the polyolefin 71 and the dichroic dye 72 have high interaction during the fabrication of a polarizing film, and may increase melt-blending property and thus may prevent agglomeration of the dichroic dyes 72 and uniformly disperse the dichroic dye 72 in the polyolefin 71.

The solubility parameter difference of the polyolefin 71 and the dichroic dye 72 may be less than or equal to about 7.0, and specifically, less than or equal to about 6.7.

The polyolefin 71 may have a solubility parameter of, for example about 15 to about 18.

When the polyolefin 71 has a solubility parameter within the range, the dichroic dye 72 may be selected from the compounds having a solubility parameter of less than about 24.

This dichroic dye 72 may include a compound represented by, for example, the following Chemical Formula 1.

Chemical Formula 1

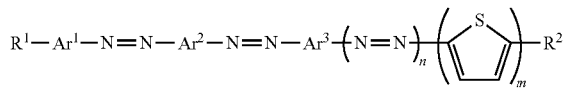

In Chemical Formula 1, $Ar^1$ to $Ar^3$ are each independently a substituted or unsubstituted C6 to C15 arylene group, $R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, or a combination thereof, $R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, a substituted or unsubstituted amino group, or a combination thereof, and n and m are independently 0 or 1.

In Chemical Formula 1, $Ar^1$ to $Ar^3$ may be each independently, for example, a substituted or unsubstituted phenylene group, a substituted or unsubstituted naphthalene group, or a substituted or unsubstituted biphenylene group. Herein, the substituted phenylene group, the substituted naphthalene group, and the substituted biphenylene group may be substituted with, for example a substituted or unsubstituted C1 to C20 alkyl group, a substituted or unsubstituted C1 to C20 alkoxy group, a halogen atom, a halogen-containing group, or a combination thereof.

In Chemical Formula 1, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, a substituted or unsubstituted C1 to C20 alkoxy group, a substituted or unsubstituted C1 to C20 thioalkyl group, —$NR^3R^4$, or a combination thereof, wherein $R^3$ and $R^4$ may be independently hydrogen, a substituted or unsubstituted C1 to C10 alkyl group, or may be linked to each other to form a ring.

For example, in Chemical Formula 1, when n and m are 1, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, —$NR^3R^4$, or a combination thereof, wherein $R^3$ and $R^4$ may be independently hydrogen, a substituted or unsubstituted C1 to C10 alkyl group, or may be linked to each other to form a ring.

In another embodiment, when n and m are 1, $R^1$ is a substituted or unsubstituted C1 to C20 alkoxy group or a substituted or unsubstituted C1 to C20 thioalkyl group, and $R^2$ is hydrogen or —$NR^3R^4$, wherein $R^3$ and $R^4$ are each independently hydrogen, substituted or unsubstituted C1 to C10 alkyl group, or are linked to each other to form a ring.

In another embodiment, when n and m are 1, $R^1$ is a substituted or unsubstituted C1 to C20 alkoxy group or a substituted or unsubstituted C1 to C20 thioalkyl group, $R^2$ is hydrogen or —$NR^3R^4$, wherein $R^3$ and $R^4$ are each independently hydrogen, substituted or unsubstituted C1 to C10 alkyl group, or are linked to each other to form a ring, and at least one $Ar^1$ to $Ar^3$ are a phenylene group, a naphthalene group or a biphenylene group substituted with a substituted or unsubstituted C1 to C20 alkyl group, a substituted or unsubstituted C1 to C20 alkoxy group, a halogen atom, a halogen-containing group, or a combination thereof.

In another embodiment, when n and m are 1, $R^1$ is a substituted or unsubstituted C5 to C20 alkoxy group or a substituted or unsubstituted C5 to C20 thioalkyl group, $R^2$ is hydrogen or —$NR^3R^4$, wherein $R^3$ and $R^4$ are linked to each other to form a ring.

The following Table 1 shows examples of the dichroic dye where n and m are 1.

TABLE 1

| No. | COMPOUND | Solubility parameter |
|---|---|---|
| 1-1-1 | $C_4H_9O$—[phenyl]—N=N—[phenyl]—N=N—[methyl-phenyl]—N=N—[thiophene]—N[piperidine] | 22.6 |
| 1-1-2 | $C_8H_{17}O$—[phenyl]—N=N—[phenyl]—N=N—[naphthalene]—N=N—[thiophene]—N[piperidine] | 23.3 |
| 1-1-3 | $C_9H_{19}O$—[phenyl]—N=N—[phenyl]—N=N—[naphthalene]—N=N—[thiophene]—N[piperidine] | 23.1 |
| 1-1-4 | $C_8H_{17}O$—[phenyl]—N=N—[phenyl]—N=N—[methyl-phenyl]—N=N—[thiophene]—N[piperidine] | 21.9 |
| 1-1-5 | $C_8H_{17}O$—[phenyl]—N=N—[phenyl]—N=N—[Cl-phenyl]—N=N—[thiophene]—N[piperidine] | 22.5 |

TABLE 1-continued

| No. | COMPOUND | Solubility parameter |
|---|---|---|
| 1-1-6 | [structure with C8H17O-phenyl-N=N-phenyl-N=N-(F-phenyl)-N=N-thiophene-piperidine] | 22.3 |
| 1-1-7 | [structure with C8H17O-phenyl-N=N-(Cl-phenyl)-N=N-phenyl-N=N-thiophene-piperidine] | 22.5 |
| 1-1-8 | [structure with C8H17O-phenyl-N=N-phenyl-N=N-(CH3-phenyl)-N=N-thiophene-piperidine] | 21.9 |
| 1-1-9 | [structure with C8H17O-phenyl-N=N-phenyl-N=N-(MeO-phenyl)-N=N-thiophene-piperidine] | 22.0 |
| 1-1-10 | [structure with C8H17O-(Cl-phenyl)-N=N-phenyl-N=N-phenyl-N=N-thiophene-piperidine] | 22.5 |
| 1-1-11 | [structure with C8H17S-phenyl-N=N-phenyl-N=N-naphthyl-N=N-thiophene-piperidine] | 23.6 |
| 1-1-12 | [structure with C8H17S-phenyl-N=N-phenyl-N=N-(H3C-phenyl)-N=N-thiophene-piperidine] | 22.3 |

For example, in Chemical Formula 1, when n and m are 0, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, $-NR^3R^4$, or a combination thereof, wherein $R^3$ and $R^4$ may be independently hydrogen, a substituted or unsubstituted C1 to C10 alkyl group, or may be linked to each other to form a ring.

In another embodiment, when n and m are 0, $R^1$ may be a substituted or unsubstituted C1 to C20 alkoxy group, a substituted or unsubstituted C1 to C20 thioalkyl group, or a substituted or unsubstituted C1 to C30 alkyl group, and $R^2$ may be hydrogen, a substituted or unsubstituted C1 to C30 alkyl group or $-NR^3R^4$, wherein $R^3$ and $R^4$ are each independently hydrogen, substituted or unsubstituted C1 to C10 alkyl group, or are linked to each other to form a ring.

The following Table 2 shows examples of the dichroic dye where n and m are 0.

TABLE 2

| No. | COMPOUND | Solubility parameter |
|---|---|---|
| 1-2-1 | 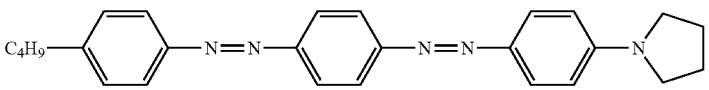 | 21.9 |
| 1-2-2 | 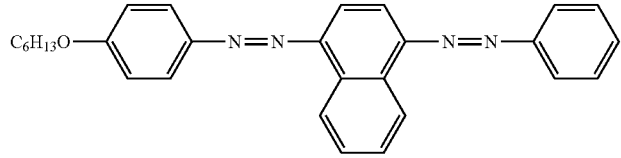 | 23.4 |
| 1-2-3 | 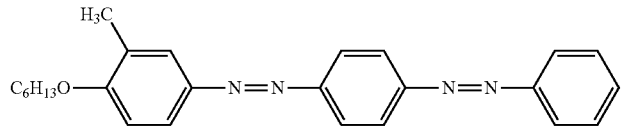 | 21.4 |
| 1-2-4 | 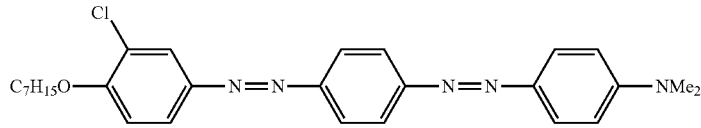 | 21.7 |
| 1-2-5 | 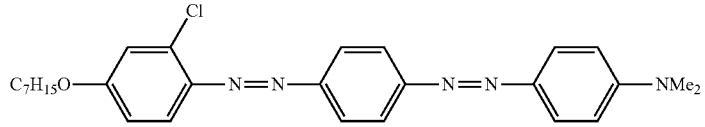 | 21.7 |
| 1-2-6 | 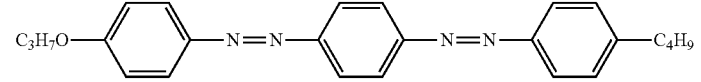 | 21.4 |

For example, in Chemical Formula 1, when n is 1 and m is 0, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C30 aryl group, —$NR^3R^4$, or a combination thereof, wherein $R^3$ and $R^4$ may be independently hydrogen, a substituted or unsubstituted C1 to C10 alkyl group, or may be linked to each other to form a ring.

In another embodiment, when n is 1 and m is 0, $R^1$ is a substituted or unsubstituted C1 to C20 alkoxy group, a substituted or a unsubstituted C1 to C20 thioalkyl group, or a substituted or unsubstituted C1 to C30 alkyl group, and $R^2$ includes a substituted or unsubstituted C6 to C30 aryl group.

The following Table 3 shows examples of the dichroic dye wherein n is 1 and m is 0.

TABLE 3

| No. | COMPOUND | Solubility parameter |
|---|---|---|
| 1-3-1 | 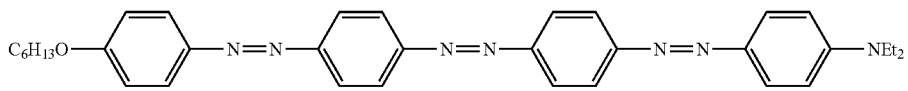 | 21.7 |
| 1-3-2 | 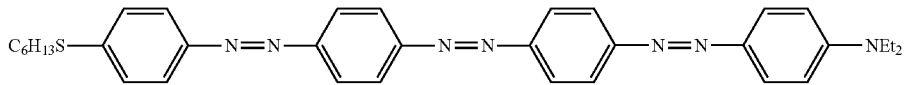 | 22.1 |

TABLE 3-continued

| No. | COMPOUND | Solubility parameter |
|---|---|---|
| 1-3-3 | C₄H₉—⟨benzene⟩—N=N—⟨benzene⟩—N=N—⟨naphthalene⟩—N=N—⟨benzene⟩—NEt₂ | 23.1 |
| 1-3-4 | C₆H₁₃O—⟨benzene⟩—N=N—⟨benzene⟩—N=N—⟨naphthalene⟩—N=N—⟨benzene⟩—NEt₂ | 23.0 |
| 1-3-5 | C₆H₁₃S—⟨benzene⟩—N=N—⟨benzene⟩—N=N—⟨naphthalene⟩—N=N—⟨benzene⟩—NEt₂ | 23.3 |
| 1-3-6 | C₈H₁₇O—⟨benzene⟩—N=N—⟨benzene(MeO)⟩—N=N—⟨benzene⟩—N=N—⟨naphthalene⟩—NEt₂ | 22.6 |

The dichroic dye 72 may have a decomposition temperature of greater than or equal to about 245° C. Herein, the decomposition temperature denotes a temperature at which the dichroic dye 72 has about 5% less weight than the initial weight thereof.

The dichroic dye 72 may be included in an amount of about 0.01 to about 5 parts by weight based on 100 parts by weight of the polyolefin 71. When the dichroic dye 72 is included within the range, sufficient polarization properties may be obtained without deteriorating transmittance of a polarizing film. The dichroic dye 72 may be included in an amount of about 0.05 to about 1 part by weight within the range based on 100 parts by weight of the polyolefin 71.

A polarizing film 70 may have a dichroic ratio ranging from about 3 to about 10 in a visible ray wavelength region ranging from about 380 nm to about 780 nm. Herein, the dichroic ratio may be calculated by dividing plane polarization absorbance in a vertical direction with the axis of a polymer by polarization absorbance in a horizontal direction according to the following equation 1.

$$DR = Log(1/T_\perp)/Log(1/T_\parallel) \qquad \text{Equation 1}$$

In Equation 1,

DR denotes a dichroic ratio of a polarizing film, $T_\parallel$ is light transmittance of light entering parallel to the transmissive axis of a polarizing film, and $T_\perp$ is light transmittance of light entering vertical to the transmissive axis of the polarizing film.

The dichroic ratio shows to what degree the dichroic dyes 72 are arranged in the polarizing film 70 in one direction. When the polarizing film 70 has a dichroic ratio within the range of about 3 to about 10 in a visible ray wavelength region, the dichroic dyes 72 are arranged according to arrangement of polymer chains, improving polarization properties of the polarizing film 70.

The polarizing film 70 may have light transmittance of greater than or equal to about 30%, and specifically, ranging from about 30% to about 95%. When the polarizing film 70 having light transmittance within the range is applied to one side of a display device, light emitting from the display device may not be prevented.

The polarizing film 70 may be a melt-blend of the polyolefin 71 and the dichroic dye 72. The melt-blend may be obtained by melt-blending a composition for a polarizing film including the polyolefin 71 and the dichroic dye 72 at a temperature greater than or equal to a melting point ("$T_m$") of the polyolefin 71.

The composition for a polarizing film may include the aforementioned polyolefin 71 and dichroic dye 72. The polyolefin 71 and the dichroic dye 72 are respectively a solid such as a powder. The composition for a polarizing film may include, for example, a solid content of greater than or equal to about 90 wt %, and for example, not including a solvent.

The polarizing film 70 may be fabricated by melt-blending and elongating the composition for a polarizing film.

Specifically, the polarizing film 70 may be fabricated by, for example, melt-blending a composition for a polarizing film including the polyolefin and the dichroic dye, disposing the composition in a mold and pressing it into a sheet, and elongating the sheet in a uniaxial direction.

The melt-blending may be performed at a temperature of less than or equal to about 300° C., and specifically, ranging from about 150 to about 300° C.

The sheet may be formed by disposing the melt-blend in the mold, and pressing it with a high pressure or discharging it in a chill roll through a T-die.

The elongation in a uniaxial direction may be performed at a temperature ranging from about 30 to about 200° C. at an elongation rate ranging from about 400% to about 1000%. The elongation rate refers to a length ratio of a sheet after the elongation and before the elongation, and means the elongated extent of the sheet after uniaxial elongation.

The polarizing film 70 may have a thickness of less than or equal to about 100 μm, and for example, ranging from about 30 μm to about 95 μm. When the polarizing film 70 has a thickness within the range, it may be thinner than a polarizing plate requiring a protective layer such as triacetylcellulose (TAC) thus contributing to the realization of a thin display device.

The polarizing film may be used in various display devices.

The display device may be a liquid crystal display (LCD).

Figure 2:
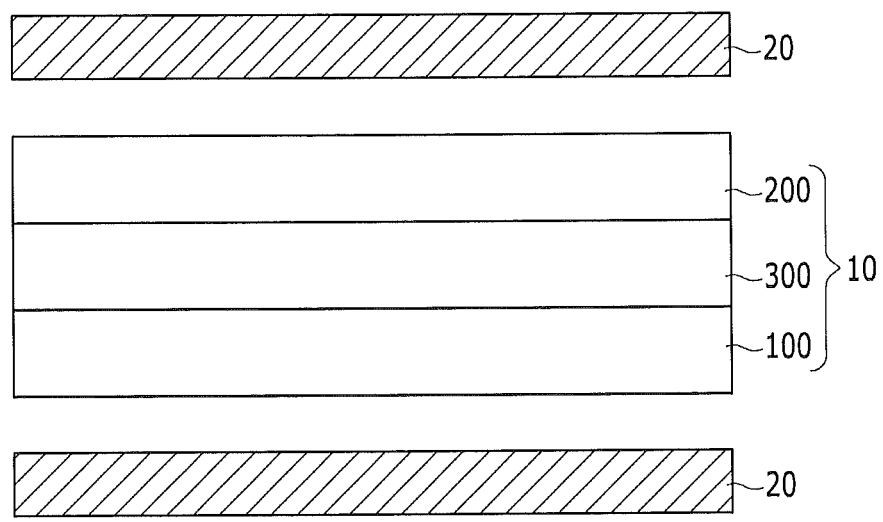
FIG. 2 is a cross-sectional view showing a liquid crystal display (LCD) according to an embodiment.

FIG. 2 is a cross-sectional view showing a liquid crystal display (LCD) according to an embodiment.

Referring to FIG. 2, the liquid crystal display (LCD) includes a liquid crystal panel 10 and a polarizing film 20 disposed on both the lower part and the upper part of the liquid crystal display panel 10.

The liquid crystal panel 10 may be a twist nematic ("TN") mode panel, a patterned vertical alignment ("PVA") mode panel, an in-plane switching ("IPS") mode panel, an optically compensated bend ("OCB") mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown) and a first field generating electrode (not shown) connected thereto. The second display panel 200 may include, for example, a color filter (not shown) formed on the substrate and a second field generating electrode (not shown). However, it is not limited thereto, and the color filter may be included in the first display panel 100, and both the first field generating electrode and the second field generating electrode may be disposed in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axis thereof may be aligned substantially parallel to the surface of the first display panel 100 and the second display panel 200 when not applying an electric field, and may be aligned substantially perpendicular to the surface of the first display panel 100 and the second display panel 200 when applying an electric field. On the contrary, when the liquid crystal molecules have negative anisotropy, the long axis thereof may be aligned substantially perpendicular to the surface of the first display panel 100 and the second display panel 200 when not applying an electric field, and may be aligned substantially parallel to the surface of the first display panel 100 and the second display panel 200 when applying an electric field.

The polarizing film 20 is disposed on the outside of the liquid crystal display panel 10. Although it is shown to be disposed on the upper part and the lower part of the liquid crystal display panel 10 in the drawing, it may be formed on either the upper part or the lower part of liquid crystal display panel 10.

The polarizing film 20 includes a polyolefin and a dichroic dye having a solubility parameter difference in a predetermined range with the polyolefin resin. Both the polyolefin and the dichroic dye are the same as described above.

The display device may be an organic light emitting diode (OLED) display.

Figure 3:
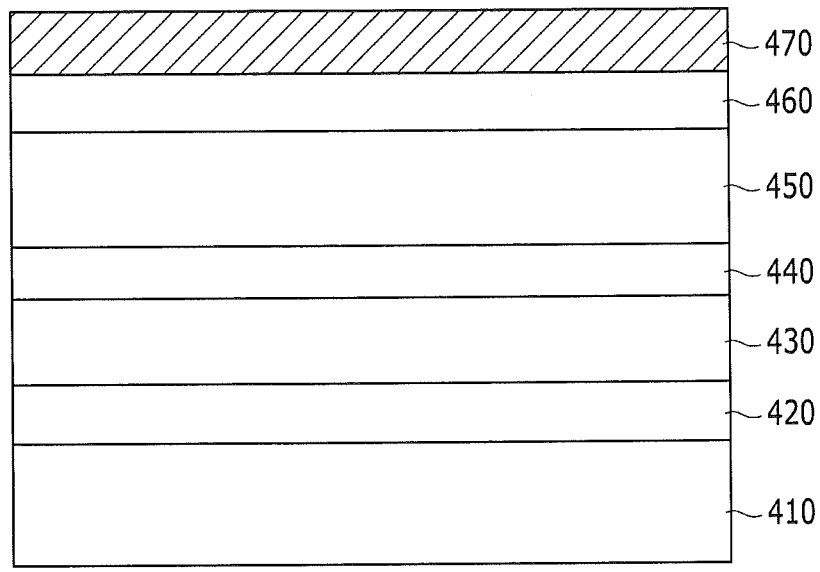
FIG. 3 is a cross-sectional view an organic light emitting diode (OLED) display according to an embodiment.

FIG. 3 is a cross-sectional view an organic light emitting diode (OLED) display according to an embodiment.

Referring to FIG. 3, an organic light emitting diode (OLED) display according to an embodiment includes a base substrate 410, a lower electrode 420, an organic emission layer 430, an upper electrode 440, an encapsulation substrate 450, a phase difference film 460, and a polarizing film 470.

The base substrate 410 may be formed of glass or plastic.

Either of the lower electrode 420 and the upper electrode 440 may be an anode, while the other is a cathode. The anode is an electrode where holes are injected and is formed of a transparent conductive material having a high work function and externally transmitting entered light, for example, indium tin oxide ("ITO") or indium zinc oxide ("IZO"). The cathode is an electrode where electrons are injected, and is formed of a conducting material having a low work function and having no influence on an organic material, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be included between the lower electrode 420 and the organic emission layer 430 and between the upper electrode 440 and the organic emission layer 430. The auxiliary layer may include a hole transport layer for balancing electrons and holes, a hole injection layer ("HIL"), an electron injection layer ("EIL"), and an electron transport layer.

The encapsulation substrate 450 may be made of glass, metal, or a polymer. The lower electrode 420, the organic emission layer 430, and the upper electrode 440 are sealed to prevent moisture and/or oxygen from externally flowing in.

The phase difference film 460 may circularly polarize light passing the polarizing film 470 and generate a phase difference, thus having an influence on reflection and absorption of the light. The phase difference film 460 may be omitted depending on the case.

The polarizing film 470 may be disposed at a side where light enters. For example, the polarizing film 470 may be disposed outside of the base substrate 410 in a bottom emission in which a light enters from the base substrate 410, and outside of the encapsulation substrate 450 in a top emission in which light enters from the encapsulation substrate 450.

The polarizing film 470 includes a polyolefin and a dichroic dye having a solubility parameter difference within a predetermined range with the polyolefin as aforementioned, and may play a role of a light absorption layer absorbing an external light and thus prevent display characteristic deterioration due to reflection of the external light.

Although polyolefins have been described as suitable for use in the polarizing film, LCD, and OLED displays as described above and in connection with FIGS. 1-3, it is appreciated that a transparent polymer that is able to be melt-blended at relatively high temperature, for example having a melting point of higher than or equal to about 130° C., can be used in place of the polyolefin. The transparent polymer may have an average light transmittance ratio of greater than or equal to about 85% in a visible ray wavelength region and a crystallinity of about 20% to about 60%. The transparent polymer may include polyester such as a polyethylene terephthalate and a polyethylene naphthalate, as well as above-described polyolefin, and a combination thereof. Polyethylene terephthalate and polyethylene naphthalate are hydrophobic polymers having a solubility parameter of about 15 to about 21, respectively. A solubility parameter difference between the dichroic dye and the transparent polymer is less than 7.4.

Hereinafter, the present disclosure is illustrated in more detail with reference to examples. However, they are exemplary embodiments, and the present disclosure is not limited thereto.

Calculation of Solubility Parameter

A Hildebrand solubility parameter is used to calculate compatibility between the dichroic dye and the polyolefin resin.

In general, molecules are agglomerated due to composite cohesive energy such as a Van der Waals interaction, dipole moments, and the like. This cohesive energy ("Ecoh") is internal energy change per mole and may be represented according to the following Relationship Formula 1.

$$E_{coh} = \Delta U = \Delta H - \Delta T \quad \text{Relationship Formula 1}$$

In Relationship Formula 1, $E_{coh}$ denotes cohesive energy, $\Delta U$ denotes an internal energy change amount per mole, $\Delta H$ denotes an enthalpy change amount, and $\Delta T$ denotes a temperature change amount. For a small molecule such as a dichroic dye, enthalpy change $\Delta H$ is the same as heat of vaporization.

In addition, cohesive energy per unit volume may be defined as cohesive energy density ("CED"). The cohesive energy density (CED) may be expressed according to the following Relationship Formula 2.

$$CED = (\Delta H - RT)/Vm \quad \text{Relationship Formula 2}$$

In Relationship Formula 2, CED denotes cohesive energy density, $\Delta H$ denotes an enthalpy change amount, R denotes a constant, T denotes a temperature, and Vm denotes a mole volume.

The cohesive energy density is used to define a Hildebrand solubility parameter capable of numerically expressing dissolution capability. The solubility parameter may be calculated by using density or mole volume at a predetermined temperature according to the following Relationship Formula 3.

$$\delta = (CED)^{0.5} = (\Sigma Ecoh_i / \Sigma Vm_i)^{0.5} \quad \text{Relationship Formula 3}$$

In Relationship Formula 3, $\delta$ denotes a solubility parameter, CED denotes cohesive energy density, $Ecoh_i$ denotes cohesive energy for a functional group in a molecule, and $Vm_i$ denotes a molar volume of the i functional group on the molecule.

The Hildebrand solubility parameter used to design the structure of a dichroic dye may be calculated by group contribution of a molecule.

Table 4 shows group contribution of cohesive energy (Ecoh) and mole volume ("Vm") used to calculate the solubility parameter of the dichroic dye. (References: Polym. Eng. Sci. 1974, 14, 147.; J. Appl. Polym. Sci. 2005, 96, 416.)

TABLE 4

| Functional Group | $Ecoh_i$ (J/mol) | $Vm_i$ (cm$^3$/mol) |
|---|---|---|
| —CH$_3$ | 4707 | 33.5 |
| —CH$_2$— | 4937 | 16.1 |
| —CH— | 3431 | −1.0 |
| C | 1464 | −19.2 |
| H$_2$C= | 4310 | 28.5 |
| —CH= | 4310 | 13.5 |
| C= | 4310 | −5.5 |
| Phenyl | 31924 | 71.4 |
| Phenylene (o, m, p) | 31924 | 52.4 |
| Phenyl (trisubstituted) | 31924 | 33.4 |
| Phenyl (tetrasubstituted) | 31924 | 14.4 |
| Phenyl (pentasubstituted) | 31924 | −4.6 |
| Phenyl (hexasubstituted) | 31924 | −23.6 |
| Ring closure 5 or more atoms | 1046 | 16.0 |
| Ring closure 3 or 4 atoms | 3138 | 18.0 |
| —COOH | 27614 | 28.5 |
| —CO$_2$— | 17991 | 18.0 |
| —CO— | 17364 | 10.8 |
| —CONH— | 33472 | 9.5 |
| —NH$_2$ | 12552 | 19.2 |
| —NH— | 8368 | 4.5 |
| N | 4184 | −9.0 |
| —N= | 11715 | 5.0 |
| —N=N— | 4188 | 0.0 |
| —CN | 25522 | 24.0 |
| NO$_2$ | 15355 | 32.0 |
| —O— | 3347 | 3.8 |
| —OH | 29790 | 10.0 |
| S | 14142 | 12.0 |
| —F | 4184 | 18.0 |
| —Cl | 11548 | 24.0 |
| —Br | 15481 | 30.0 |
| —I | 19037 | 31.5 |

For example, a dichroic dye represented by the following Chemical Formula 1a may be calculated regarding the solubility parameter using cohesive energy ("$Ecoh_i$") and mole volume ("$Vm_i$") provided in the following Table 5 according to Relationship Formula 3.

Chemical Formula 1a

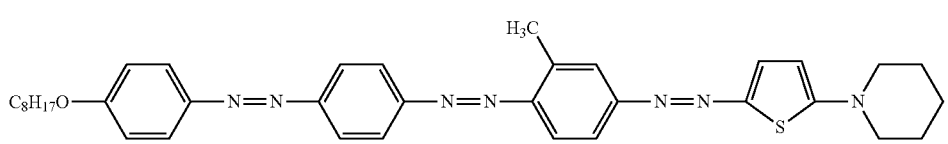

TABLE 5

| Functional Group | $Ecoh_i$ (J/mol) | $Vm_i$ (cm$^3$/mol) |
|---|---|---|
| CH$_3$ × 2 | 9414 | 67.0 |
| CH$_2$ × 12 | 59244 | 193.2 |
| O | 3347 | 3.8 |
| Phenylene (o, m, p) × 2 | 63848 | 104.8 |
| Phenyl (trisubstituted) | 31924 | 33.4 |
| —N=N— × 3 | 12564 | 0.0 |
| S | 14142 | 12.0 |
| —CH= × 2 | 8620 | 27.0 |

TABLE 5-continued

| Functional Group | Ecoh$_i$ (J/mol) | Vm$_i$ (cm$^3$/mol) |
|---|---|---|
| C= × 2 | 8620 | −11.0 |
| N | 4184 | −9.0 |
| Ring closure 5 or more atoms × 2 | 2092 | 32.0 |
| Total | 217999 | 453.2 |
| δ, (J/cm$^3$)$^{0.5}$ | 21.9 | |

The dichroic dye represented by Chemical Formula 1a has a solubility parameter of 21.9.

SYNTHESIS OF DICHROIC DYE

Synthesis Example 1

1-1. Synthesis of Monoazo Compound 10 g (41.1 mmol) of 4-(4-nitrophenylazo)phenol (TCI, Japan) is dissolved in 200 mL of acetone, and 8.5 mL (48.9 mmol) of 1-bromooctane and 11.4 g (82.5 mmol) of potassium carbonate ($K_2CO_3$) are added thereto. The reaction mixture is refluxed and agitated at 60° C. for 24 hours and then cooled down to room temperature. The agitated mixture is concentrated and purified through silica gel column chromatography ($CH_2Cl_2$:n-hexane=2:1), obtaining 12.3 g (34.6 mmol) of a 4-nitro compound. The compound has a yield of 84%. 5.7 g (16.0 mmol) of the 4-nitro compound is dissolved in 150 mL of hot ethanol, and a solution prepared by dissolving 11.5 g (47.9 mmol) of $Na_2S.9H_2O$ in hot ethanol and water is added thereto. The resulting mixture is agitated at 80° C. for 5 hours and cooled down to room temperature. Then, a precipitated crystal is filtered, washed several times with water, and dried, obtaining 4.3 g (13.2 mmol) of 4-amino-4'-octyloxyazobenzene. The obtained compound has a yield of 82%.

The 4-amino-4'-octyloxyazobenzene is analyzed by $^1$H NMR (Brucker Co., 300 MHz).

The $^1$H NMR analysis result is as follows.

$^1$H NMR (300 MHz, $CDCl_3$) δ (ppm): 0.89 (t, J=6.9 Hz, 3 H, $CH_3$), 1.26-1.34 (m, 8 H, $CH_2$×4), 1.45-1.49 (m, 2 H, $CH_2$), 1.57-1.83 (m, 2 H, $CH_2$), 3.98 (br s, 2H, $NH_2$), 4.02 (t, J=6.6 Hz, 2H, $OCH_2$), 6.74 (d, J=8.9 Hz, 2H, ArH), 6.97 (d, J=8.9 Hz, 2H, ArH), 7.76 (d, J=8.9 Hz, 2H, ArH), 7.82 (d, J=8.9 Hz, 2H, ArH).

1-2. Synthesis of Bisazo Compound 2 g (6.15 mmol) of the 4-amino-4'-octyloxyazobenzene is dissolved in 120 mL of dimethyl acetamide (DMAc) and 30 mL of acetic acid (AcOH). 3 mL of 12N HCl is added thereto. The mixture is maintained at 0° C. Then, 446 mg (6.46 mmol) of sodium nitrate ($NaNO_3$) is dissolved in 2 mL of water to prepare a solution. The solution is slowly added in a dropwise fashion to the reaction mixture. When the addition is complete, the reactant is agitated for one hour while maintained at 0° C. Next, a solution prepared by dissolving 6.15 mmol of m-toluidine in 150 mL of methanol is slowly added in a dropwise fashion to the agitated reactants. The resulting mixture is agitated at 0° C. Then, the agitated mixture is naturalized with a sodium hydroxide (NaOH) aqueous solution. When the reaction is complete, a precipitated solid therein is filtered. The remaining mixture is purified through silica gel column chromatography, obtaining a bisazo compound. The compound has a yield ranging from 60 to 80%.

1-3. Synthesis of Triazo Compound 1 mmol of the bisazo compound is dissolved in 20 mL of dimethyl acetamide (DMAc) and 5 mL of acetic acid (AcOH), and 0.5 mL of 12N HCl is added thereto. The mixture is maintained at 0° C. Next, a solution prepared by dissolving 72 mg (1.04 mmol) of sodium nitrate ($NaNO_3$) in 1 mL of water is slowly added in a dropwise fashion to the reaction mixture. When the addition is complete, the reactant is agitated for one hour while maintained 0° C. Next, a solution prepared by dissolving 167 mg (1 mmol) of 2-piperidinothiophene in 25 mL of methanol is slowly added in a dropwise fashion to the reaction mixture. The resulting mixture is agitated at 0° C. for one hour. The agitated mixture is naturalized with a sodium hydroxide (NaOH) aqueous solution. When the reaction is complete, a precipitated solid is filtered. The remaining mixture is purified through silica gel column chromatography (n-hexane:EtOAc=3:1), obtaining 398 mg (0.64 mmol) of a triazo dichroic dye represented by the following Chemical Formula 1a. The dye has a yield of 64%.

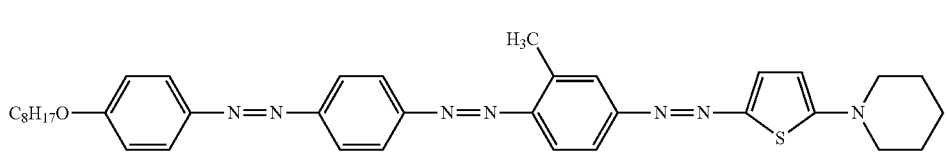

Chemical Formula 1a

The dichroic dye represented by the above Chemical Formula 1a is analyzed by $^1$H NMR (Brucker Co., 300 MHz).

The $^1$H NMR analysis result is as follows.

1H NMR (300 MHz, CDCl3) δ(ppm): 0.90 (t, J=6.6 Hz, 3 H, CH3), 1.25-1.33 (m, 8 H, CH2×4), 1.45-1.48 (m, 2 H, CH2), 1.70-1.88 (m, 8 H, CH2×4), 2.80 (s, 3 H, CH3), 3.44-3.46 (m, 4 H, NCH2×2), 4.05 (t, J=6.5 Hz, 2 H, OCH2), 6.20 (d, J=4.5 Hz, 1 H, ArH), 7.02 (d, J=8.9 Hz, 2 H, ArH), 7.58-8.07 (m, 10H, ArH).

The dichroic dye represented by the above Chemical Formula 1a has a solubility parameter of 21.9.

Synthesis Example 2

456 mg (0.71 mmol) of a dichroic dye represented by the following Chemical Formula 1b is prepared according to the same method as Synthesis Example 1, except for using 3-chloroaniline instead of m-toluidine. The dichroic dye has a yield of 71%.

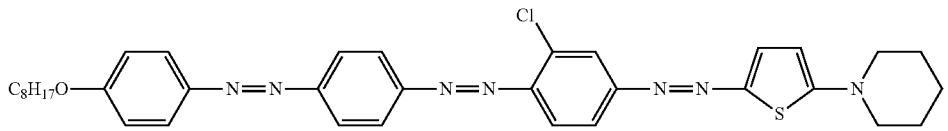

Chemical Formula 1b

The dichroic dye represented by the above Chemical Formula 1 b is analyzed by $^1$H NMR (Brucker Co., 300 MHz).

The $^1$H NMR analysis result is as follows.

$^1$H NMR (300 MHz, CDCl$_3$) δ (ppm): 0.90 (t, J=6.7 Hz, 3 H, CH$_3$), 1.25-1.38 (m, 8 H, CH$_2$×4), 1.45-1.49 (m, 2 H, CH$_2$), 1.71-1.86 (m, 8 H, CH$_2$×4), 3.46-3.50 (m, 4 H, NCH$_2$× 2), 4.06 (t, J=6.4 Hz, 2 H, OCH$_2$), 6.24 (d, J=4.8 Hz, 1 H, ArH), 7.02 (d, J=9.0 Hz, 2 H, ArH), 7.61-8.12 (m, 10 H, ArH).

The dichroic dye represented by the above Chemical Formula 1 b has a solubility parameter of 22.5.

Synthesis Example 3

450 mg (0.7 mmol) of a dichroic dye represented by the following Chemical Formula 1c is prepared according to the same method as Synthesis Example 1, except for using 4-amino-2-chloro-4'-octyloxyazobenzene instead of 4-amino-4'-octyloxyazobenzene and aniline instead of m-toluidine. The dichroic dye has a yield of 70%.

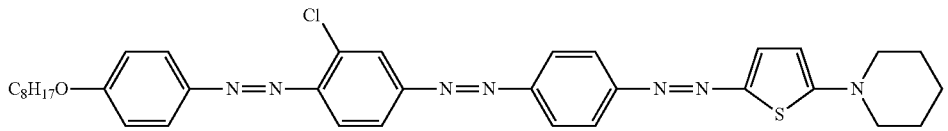

Chemical Formula 1c

The dichroic dye represented by the above Chemical Formula 1c is analyzed by $^1$H NMR.

The $^1$H NMR analysis result is as follows (Brucker Co., 300 MHz).

$^1$H NMR (300 MHz, CDCl$_3$) δ (ppm): 0.90 (t, J=6.7 Hz, 3 H, CH$_3$), 1.25-1.36 (m, 8 H, CH$_2$×4), 1.45-1.50 (m, 2 H, CH$_2$), 1.71-1.85 (m, 8 H, CH$_2$×4), 3.43-3.47 (m, 4 H, NCH$_2$× 2), 4.06 (t, J=6.6 Hz, 2 H, OCH$_2$), 6.21 (d, J=4.7 Hz, 1 H, ArH), 7.02 (d, J=9.0 Hz, 2 H, ArH), 7.59-8.11 (m, 10 H, ArH).

The dichroic dye represented by the above Chemical Formula 1c has a solubility parameter of 22.5.

Synthesis Example 4

466 mg (0.75 mmol) of a dichroic dye represented by the following Chemical Formula 1d is prepared according to the same method as Synthesis Example 1, except for using o-toluidine instead of m-toluidine. The dichroic dye has a yield of 75%.

The dichroic dye represented by the above Chemical Formula 1d is analyzed by $^1$H NMR.

The $^1$H NMR analysis result is as follows (Brucker Co., 300 MHz).

$^1$H NMR (300 MHz, CDCl$_3$) δ (ppm): 0.90 (t, J=6.6 Hz, 3 H, CH$_3$), 1.22-1.36 (m, 8 H, CH$_2$×4), 1.45-1.50 (m, 2 H, CH$_2$), 1.71-1.86 (m, 8 H, CH$_2$×4), 2.67 (s, 3 H, CH$_3$), 3.42-3.45 (m, 4 H, NCH$_2$×2), 4.05 (t, J=6.5 Hz, 2 H, OCH$_2$), 6.18 (d, J=4.7 Hz, 1 H, ArH), 7.02 (d, J=8.9 Hz, 2 H, ArH), 7.56-8.07 (m, 10 H, ArH).

The dichroic dye represented by the above Chemical Formula 1d has a solubility parameter of 21.9.

Synthesis Example 5

357 g (0.63 mmol) of a dichroic dye represented by the following Chemical Formula 1e is prepared according to the same method as Synthesis Example 1, except for using 4-amino-4'-butyloxyazobenzene instead of 4-amino-4'-octyloxyazobenzene. The dichroic dye has a yield of 63%.

Chemical Formula 1d

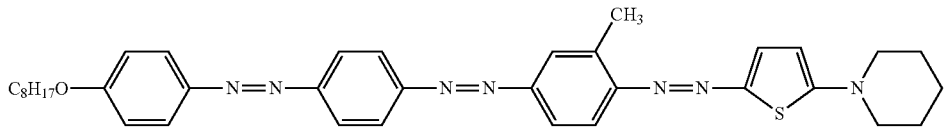

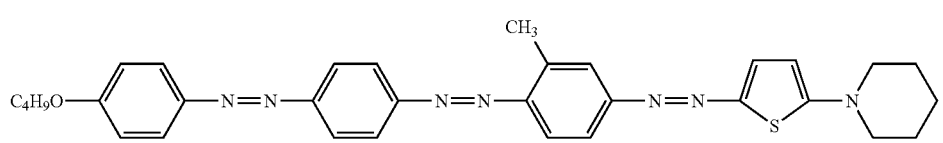

Chemical Formula 1e

The dichroic dye represented by the above Chemical Formula 1e is analyzed by $^1$H NMR (Brucker Co., 300 MHz).

The $^1$H NMR analysis result is as follows.

$^1$H NMR (300 MHz, CDCl$_3$) δ (ppm): 1.00 (t, J=7.2 Hz, 3 H, CH$_3$), 1.47-1.59 (m, 2 H, CH$_2$), 1.70-1.86 (m, 8 H, CH$_2$× 4), 2.80 (s, 3 H, CH$_3$), 3.43-3.46 (m, 4 H, NCH$_2$×2), 4.06 (t, J=6.4 Hz, 2 H, OCH$_2$), 6.19 (d, J=4.3 Hz, 1 H, ArH), 7.02 (d, J=8.5 Hz, 2 H, ArH), 7.57-8.07 (m, 10 H, ArH).

The dichroic dye represented by the above Chemical Formula 1e has a solubility parameter of 22.6.

Synthesis Example 6

494 mg (0.75 mmol) of a dichroic dye represented by the following Chemical Formula 1f is prepared according to the same method as Synthesis Example 1, except for using 1-naphthylamine instead of m-toluidine. The dichroic dye has a yield of 75%.

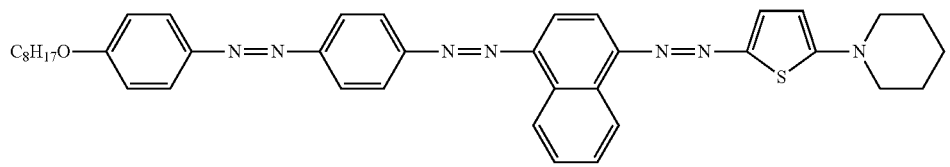

Chemical Formula 1f

The dichroic dye represented by the above Chemical Formula 1f is analyzed by $^1$H NMR (Brucker Co., 300 MHz).

The $^1$H NMR analysis result is as follows.

$^1$H NMR (300 MHz, CDCl$_3$) δ (ppm): 0.90 (t, J=6.9 Hz, 3 H, CH$_3$), 1.22-1.36 (m, 8 H, CH$_2$×4), 1.45-1.50 (m, 2 H, CH$_2$), 1.73-1.85 (m, 8 H, CH$_2$×4), 3.48-3.52 (m, 4 H, NCH$_2$× 2), 4.06 (t, J=6.6 Hz, 2 H, OCH$_2$), 6.24 (d, J=4.7 Hz, 1 H, ArH), 7.02 (d, J=9.0 Hz, 2 H, ArH), 7.63-8.19 (m, 11 H, ArH), 8.93 (d, J=8.8 Hz, 1 H, ArH), 9.04 (d, J=8.8 Hz, 1 H, ArH).

The dichroic dye represented by the above Chemical Formula 1f has a solubility parameter of 23.3.

Synthesis Example 7

A dichroic dye represented by the following Chemical Formula 1g is prepared according to the same method as Synthesis Example 1, except for using 4-amino-4'-butylazobenzene instead of 4-amino-4'-octyloxyazobenzene and phenol instead of m-toluidine along with a sodium hydroxide aqueous solution and then further using propylbromide.

Chemical Formula 1g

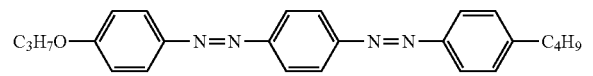

The dichroic dye represented by the above Chemical Formula 1g is analyzed by $^1$H NMR.

The $^1$H NMR analysis result is as follows (Brucker Co., 300 MHz).

$^1$H NMR (300 MHz, CDCl$_3$) δ (ppm): 0.95 (t, J=7.3 Hz, 3H, CH$_3$), 1.07 (t, J=7.3 Hz, 3 H, CH$_3$), 1.34-1.43 (m, 2 H, CH$_2$), 1.58-1.66 (m, 2 H, CH$_2$), 1.82-1.89 (m, 2 H, CH$_2$), 2.70 (t, J=7.7 Hz, 2 H, ArCH$_2$), 4.01 (t, J=6.6 Hz, 2H, OCH$_2$), 7.01 (d, J=9.0 Hz, 2 H, ArH), 7.33 (d, J=8.4 Hz, 2 H, ArH), 7.86-8.02 (m, 8 H, ArH).

The dichroic dye represented by the above Chemical Formula 1g has a solubility parameter of 21.4.

Synthesis Example 8

A dichroic dye represented by the following Chemical Formula 1h is prepared according to the same method as Synthesis Example 1, except for using 4-amino-4'-N,N-dimethylazobenzene instead of 4-amino-4'-octyloxyazobenzene and 2-chlorophenol instead of m-toluidine along with a sodium hydroxide aqueous solution and then further using heptyl bromide.

Chemical Formula 1h

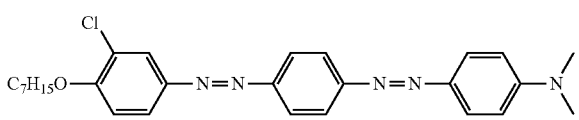

The dichroic dye represented by the above Chemical Formula 1h is analyzed by $^1$H NMR.

The $^1$H NMR analysis result is as follows (Brucker Co., 300 MHz).

$^1$H NMR (300 MHz, CDCl$_3$) δ (ppm): 0.91 (t, J=6.6 Hz, 3 H, CH$_3$), 1.31-1.39 (m, 6 H, CH$_2$×3), 1.47-1.52 (m, 2 H, CH$_2$), 1.85-1.92 (m, 2 H, CH$_2$), 3.11 (s, 6 H, CH$_3$×2), 4.12 (t, J=6.5 Hz, 2 H, OCH$_2$), 6.77 (d, J=9.1 Hz, 2 H, ArH), 7.04 (d, J=8.8 Hz, 1 H, ArH), 7.86-8.03 (m, 8 H, ArH).

The dichroic dye represented by the above Chemical Formula 1h has a solubility parameter of 21.7.

Synthesis Example 9

A dichroic dye represented by the following Chemical Formula 1i is prepared according to the same method as Synthesis Example 8, except for using 3-chlorophenol instead of 2-chlorophenol.

Chemical Formula 1i

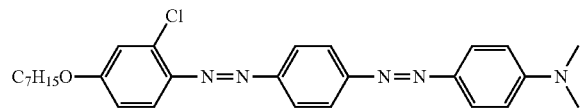

The dichroic dye represented by the above Chemical Formula 1i is analyzed by $^1$H NMR (Brucker Co., 300 MHz).
The $^1$H NMR analysis result is as follows.
$^1$H NMR (400 MHz, CDCl$_3$) δ (ppm): 0.93 (t, J=7.0 Hz, 3 H, CH$_3$), 1.28-1.42 (m, 6 H, CH$_2$×3), 1.46-1.52 (m, 2 H, CH$_2$), 1.81-1.88 (m, 2 H, CH$_2$), 3.14 (s, 6 H, CH$_3$×2), 4.05 (t, J=6.6 Hz, 2 H, OCH$_2$), 6.80 (d, J=9.2 Hz, 2 H, ArH), 6.89 (dd, J=9.2, 2.8 Hz, 1 H, ArH), 7.10 (d, J=2.8 Hz, 1 H, ArH), 7.82-8.08 (m, 7 H, ArH).

The dichroic dye represented by the above Chemical Formula 1i has a solubility parameter of 21.7.

Comparative Synthesis Example 1

A dichroic dye represented by the following Chemical Formula 2a is prepared according to the same method as Synthesis Example 6, except for using 4-amino-4'-butylazobenzene instead of 4-amino-4'-octyloxyazobenzene.

Comparative Synthesis Example 2

A dye intermediate is prepared according to the same method as Synthesis Example 6, except for using 4-amino-4'-hydroxyazobenzene instead of 4-amino-4'-octyloxyazobenzene.

The dye intermediate is analyzed by $^1$H NMR (Brucker Co., 300 MHz).
The $^1$H NMR analysis result is as follows.
$^1$H NMR (300 MHz, CDCl$_3$) δ (ppm): 1.71-1.85 (m, 6 H, CH$_2$×2), 3.48-3.52 (m, 4 H, NCH$_2$×2), 6.24 (d, J=4.7 Hz, 1 H, ArH), 7.02 (d, J=9.0 Hz, 2 H, ArH), 7.63-8.19 (m, 11 H, ArH), 8.93 (d, J=8.8 Hz, 1 H, ArH), 9.04 (d, J=8.8 Hz, 1 H, ArH).

500 mg (0.92 mmol) of the dye intermediate is dissolved in 10 mL of dichloromethane (CH$_2$Cl$_2$) and 1 mL of triethylamine (Et$_3$N), and 258 μl (1.38 mmol) of 4-butylbenzoylchloride is added thereto. The mixture is agitated for 24 hours. The agitated reaction mixture is concentrated and purified through silica gel column chromatography (n-hexane: EtOAc=3:1), obtaining 545 mg (0.77 mmol) of a dichroic dye Chemical Formula 2a

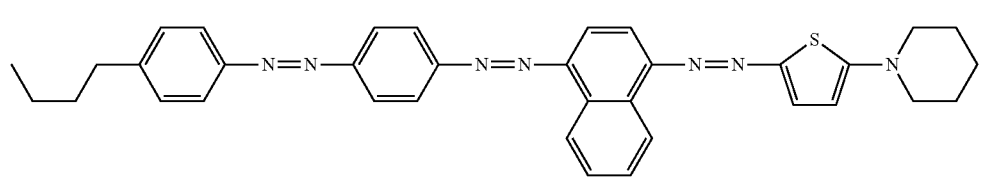

represented by the following Chemical Formula 2b. The dichroic dye has a yield of 84%.

Chemical Formula 2b

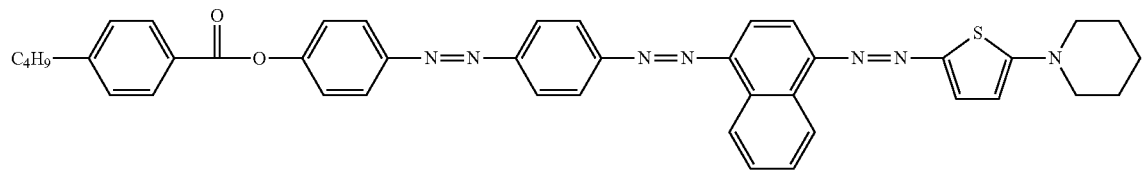

The dichroic dye represented by the above Chemical Formula 2a is analyzed by $^1$H NMR (Brucker Co., 300 MHz).

The $^1$H NMR analysis result is as follows.
$^1$H NMR (300 MHz, CDCl$_3$) δ (ppm): 0.96 (t, J=7.2 Hz, 3 H, CH$_3$), 1.37-1.41 (m, 2 H, CH$_2$), 1.61-1.76 (m, 8 H, CH$_2$×4), 2.71 (t, J=7.7 Hz, 2 H, ArCH$_2$), 3.48-3.52 (m, 4 H, NCH$_2$×2), 6.24 (d, J=4.7 Hz, 1 H, ArH), 7.33-8.17 (m, 13 H, ArH), 8.93 (d, J=8.8 Hz, 1 H, ArH), 9.04 (d, J=8.8 Hz, 1 H, ArH).

The dichroic dye represented by the above Chemical Formula 2a has a solubility parameter of 24.0.

The dichroic dye represented by the above Chemical Formula 2b is analyzed by $^1$H NMR (Brucker Co., 300 MHz).
The $^1$H NMR analysis result is as follows.
$^1$H NMR (300 MHz, CDCl$_3$) δ (ppm): 0.96 (t, J=7.3 Hz, 3 H, CH$_3$), 1.36-1.43 (m, 2 H, CH$_2$), 1.61-1.69 (m, 2 H, CH$_2$), 1.71-1.78 (m, 6 H, CH$_2$×3), 2.73 (t, J=7.7 Hz, 2 H, ArCH$_2$), 3.49-3.54 (m, 4 H, NCH$_2$×2), 6.26 (d, J=4.8 Hz, 1 H, ArH), 7.33-8.19 (m, 17 H, ArH), 8.94 (d, J=8.5 Hz, 1 H, ArH), 9.05 (d, J=8.5 Hz, 1 H, ArH).

The dichroic dye represented by the above Chemical Formula 2b has a solubility parameter of 24.4.

Comparative Synthesis Example 3

500 mg (0.92 mmol) of a dye intermediate represented by Comparative Synthesis Example 2 is dissolved in 10 mL of dichloromethane ($CH_2Cl_2$) and 1 mL of triethylamine ($Et_3N$), and 166 mg (1.38 mmol) of pentanoyl chloride is added thereto. The mixture is agitated for 24 hours. The agitated reaction mixture is concentrated and purified through silica gel column chromatography (n-hexane:EtOAc=3:1), obtaining 492 mg (0.78 mmol) of a dichroic dye represented by the following Chemical Formula 2c. The dichroic dye has a yield of 85%.

Chemical Formula 2c

The dichroic dye represented by the above Chemical Formula 2c is analyzed by $^1$H NMR (Brucker Co., 300 MHz).

The $^1$H NMR analysis result is as follows.

$^1$H NMR (300 MHz, $CDCl_3$) δ (ppm): 0.99 (t, J=7.3 Hz, 3 H, $CH_3$), 1.43-1.50 (m, 2 H, $CH_2$), 1.73-1.84 (m, 8 H, $CH_2$×4), 2.61 (t, J=7.5 Hz, 2 H, $CH_2CO_2$), 3.48-3.52 (m, 4 H, $NCH_2$×2), 6.25 (d, J=4.7 Hz, 1 H, ArH), 7.33-8.19 (m, 13 H, ArH), 8.93 (d, J=8.3 Hz, 1 H, ArH), 9.05 (d, J=8.3 Hz, 1 H, ArH).

The dichroic dye represented by the above Chemical Formula 2c has a solubility parameter of 24.5.

Comparative Synthesis Example 4

A dichroic dye represented by the following Chemical Formula 2d is prepared according to the same method as Synthesis Example 1, except for using 1-naphthyl red hydrochloride instead of a bisazo compound.

Chemical Formula 2d

The dichroic dye represented by the above Chemical Formula 2d is analyzed by $^1$H NMR (Brucker Co., 300 MHz).

The $^1$H NMR analysis result is as follows.

$^1$H NMR (300 MHz, acetone-$d_6$) δ (ppm): 1.73-1.83 (m, 6 H, $CH_2$×3), 3.59-3.63 (m, 4 H, $NCH_2$×2), 6.53 (d, J=4.8 Hz, 1 H, ArH), 7.54-8.08 (m, 10 H, ArH), 8.92 (d, J=7.4 Hz, 1 H, ArH), 9.03 (d, J=7.4 Hz, 1 H, ArH).

The dichroic dye represented by the above Chemical Formula 2d has a solubility parameter of 24.8.

Manufacturing Polarizing Film

Example 1

A composition for a polarizing film is prepared by mixing a polyolefin (solubility parameter: 16.6) including polypropylene (PP) and a polypropylene-polyethylene copolymer (PP-PE) in a ratio of 5:5 (w/w) and 0.5 parts by weight of the dichroic dye according to the Synthesis Example 1 based on 100 parts by weight of the polyolefin resin.

The composition for a polarizing film is melt-blended at about 230° C. using a micro-compounder (DSM) to prepare a melt-blend of the polyolefin and the dichroic dye. The melt-blend is charged into a sheet mold and pressed with a high temperature and high pressure, fabricating a film. The film is elongated 1000% times in a uniaxial direction (Instron Ltd.) at 115° C., fabricating a polarizing film.

Example 2

A polarizing film is fabricated according to the same method as Example 1, except for using the dichroic dye according to Synthesis Example 2 instead of the dichroic dye according to Synthesis Example 1.

Example 3

A polarizing film is fabricated according to the same method as Example 1, except for using the dichroic dye according to Synthesis Example 3 instead of the dichroic dye according to Synthesis Example 1.

Example 4

A polarizing film is fabricated according to the same method as Example 1, except for using the dichroic dye according to Synthesis Example 4 instead of the dichroic dye according to Synthesis Example 1.

Example 5

A polarizing film is fabricated according to the same method as Example 1, except for using the dichroic dye according to Synthesis Example 5 instead of the dichroic dye according to Synthesis Example 1.

Example 6

A polarizing film is fabricated according to the same method as Example 1, except for using the dichroic dye according to Synthesis Example 6 instead of the dichroic dye according to Synthesis Example 1.

Example 7

A polarizing film is fabricated according to the same method as Example 1, except for using the dichroic dye according to Synthesis Example 7 instead of the dichroic dye according to Synthesis Example 1.

Example 8

A polarizing film is fabricated according to the same method as Example 1, except for using the dichroic dye according to Synthesis Example 8 instead of the dichroic dye according to Synthesis Example 1.

Example 9

A polarizing film is fabricated according to the same method as Example 1, except for using the dichroic dye according to Synthesis Example 9 instead of the dichroic dye according to Synthesis Example 1.

Comparative Example 1

A polarizing film is fabricated according to the same method as Example 1, except for using the dichroic dye according to Comparative Synthesis Example 1 instead of the dichroic dye according to Synthesis Example 1.

Comparative Example 2

A polarizing film is fabricated according to the same method as Example 1, except for using the dichroic dye according to Comparative Synthesis Example 2 instead of the dichroic dye according to Synthesis Example 1.

Comparative Example 3

A polarizing film is fabricated according to the same method as Example 1, except for using the dichroic dye according to Comparative Synthesis Example 3 instead of the dichroic dye according to Synthesis Example 1.

Comparative Example 4

A polarizing film is fabricated according to the same method as Example 1, except for using the dichroic dye according to Comparative Synthesis Example 4 instead of the dichroic dye according to Synthesis Example 1.

Evaluation

The polarizing films according to Examples 1 to 9 and Comparative Examples 1 to 4 are evaluated regarding light transmittance, polarization efficiency, and dichroic ratio in a visible ray region.

The light transmittance is evaluated using a V-7100 UV/Vis spectrophotometer (JASCO Inc.).

The light transmittance is evaluated by respectively measuring light transmittance of light entering parallel to the transmissive axis of the polarizing film and light transmittance of light entering perpendicular to the transmissive axis of the polarizing film.

The light transmittance is used to calculate a dichroic ratio (DR) and polarization efficiency (PE).

The dichroic ratio (DR) is obtained according to the following Equation 1.

$$DR = \text{Log}(1/T_\perp)/\text{Log}(1/T_\parallel) \quad \text{Equation 1}$$

In Equation 1,
DR denotes a dichroic ratio,
$T_\parallel$ is light transmittance for light entering parallel to the transmissive axis of a polarizing film, and
$T_\perp$ is light transmittance for a light entering perpendicular to the transmissive axis of the polarizing film.

The polarization efficiency is obtained according to the following Equation 2.

$$PE(\%) = (T_\square - T_\square)/(T_\square - T_\square)^{1/2} \times 100 \quad \text{Equation 2}$$

In Equation 2,
PE denotes polarization efficiency,
$T_\parallel$ is light transmittance for light entering parallel to the transmissive axis of a polarizing film, and
$T_\perp$ is light transmittance for light entering perpendicular to the transmissive axis of the polarizing film.

The results are illustrated referring to FIGS. 4 to 7 and Table 6.

Figure 4:
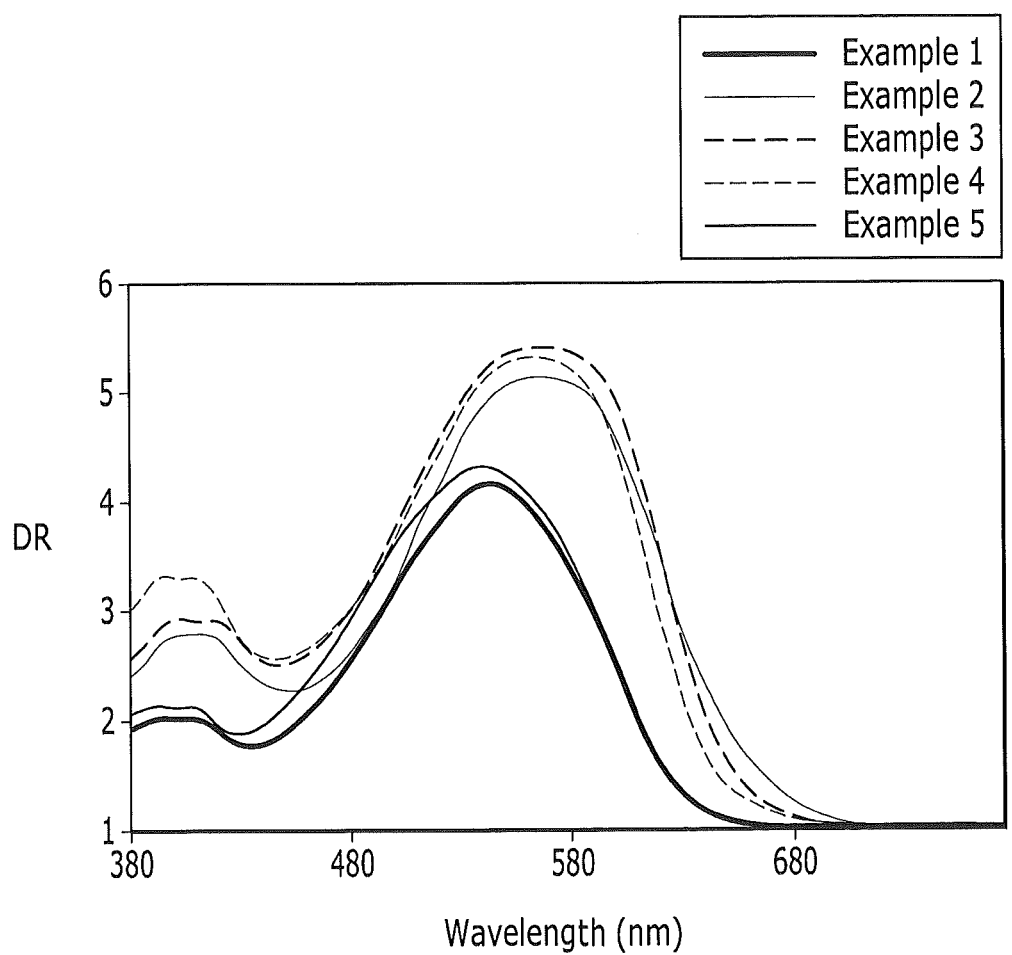
FIG. 4 is a graph of dichroic ratio ("DR") versus wavelength (nanometer, nm) showing dichroic ratios in a visible ray region of the polarizing films according to Examples 1 to 5.
Figure 5:
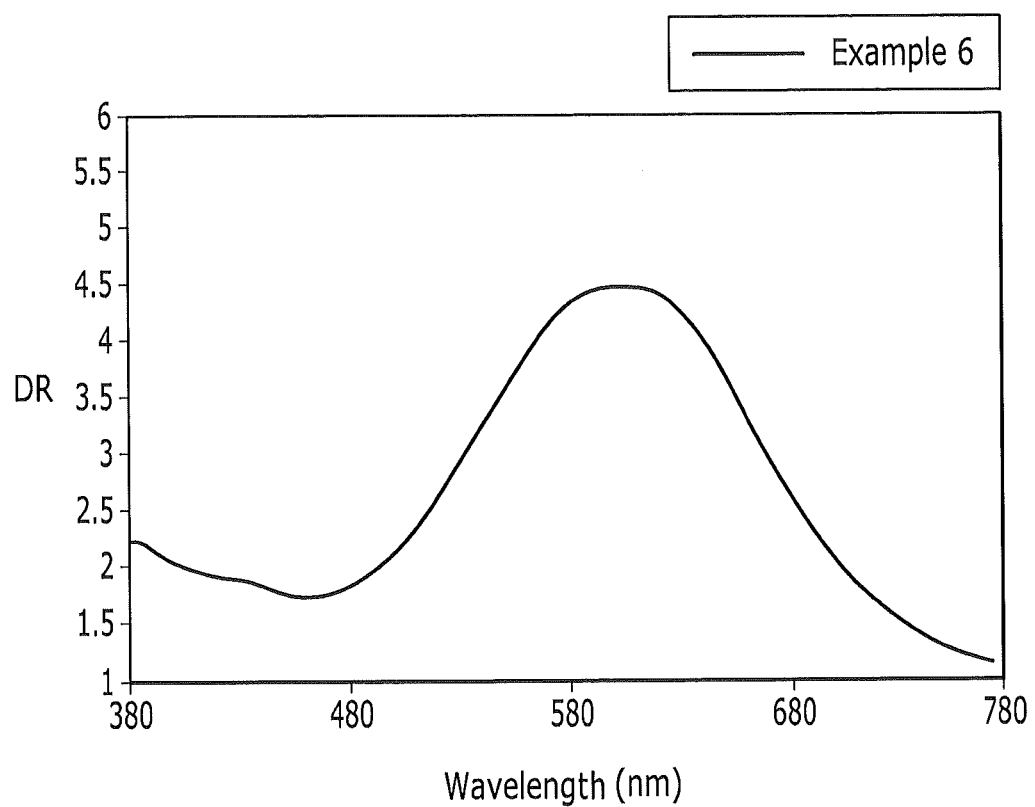
FIG. 5 is a graph of dichroic ratio (DR) versus wavelength (nanometer, nm) showing a dichroic ratio in a visible ray region of the polarizing film according to Example 6.
Figure 6:
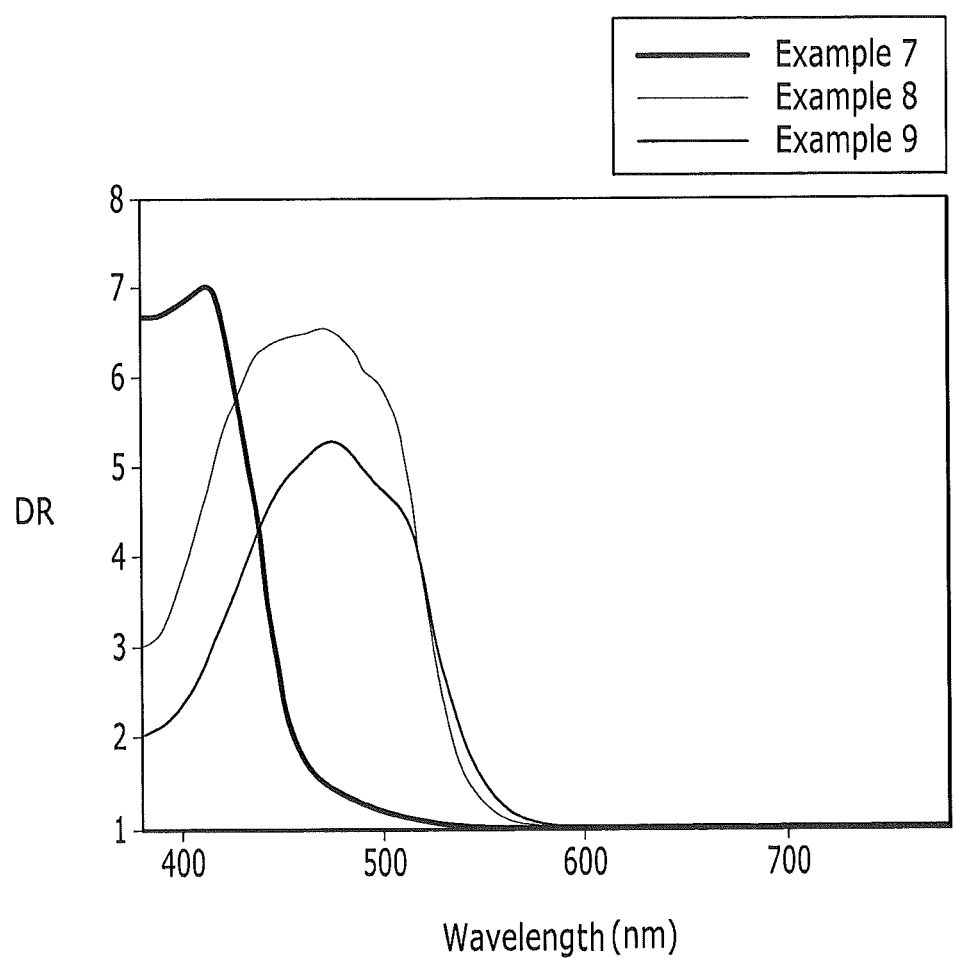
FIG. 6 is a graph of dichroic ratio (DR) versus wavelength (nanometer, nm) showing dichroic ratios in a visible ray region of the polarizing films according to Examples 7 to 9.
Figure 7:
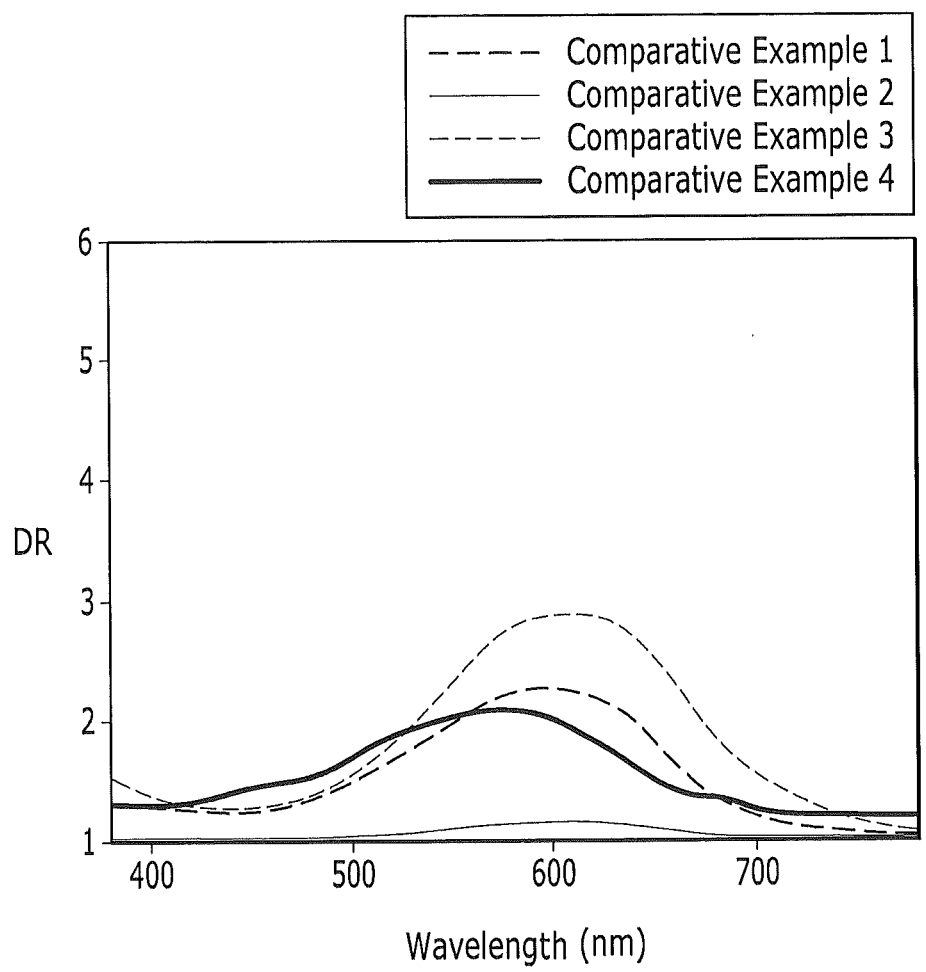
FIG. 7 is a graph of dichroic ratio (DR) versus wavelength (nanometer, nm) showing dichroic ratios in a visible ray region of the polarizing films according to Comparative Example 1 to 4.

FIG. 4 is a graph showing dichroic ratios in a visible ray region of the polarizing films according to Examples 1 to 5, FIG. 5 is a graph showing a dichroic ratio in a visible ray region of the polarizing film according to Example 6, FIG. 6 is a graph showing dichroic ratios in a visible ray region of the polarizing films according to Examples 7 to 9, and FIG. 7 is a graph showing dichroic ratios in a visible ray region of the polarizing films according to Comparative Examples 1 to 4.

In Table 6, light transmittance, polarization efficiency, and dichroic ratio of the polarizing films according to Examples 1 to 9 and Comparative Examples 1 to 4 are measured at maximum absorption wavelength ($\lambda_{max}$).

TABLE 6

|  | $\lambda_{max}$ (nm) | Light transmittance (Ts, %) | Polarization efficiency (PE, %) | Dichroic ratio (DR) | Solubility parameter difference (dye-polyolefin) |
|---|---|---|---|---|---|
| Example 1 | 555 | 36.1 | 99.84 | 4.3 | 5.3 |
| Example 2 | 555 | 37.5 | 99.60 | 5.1 | 5.9 |
| Example 3 | 540 | 33.9 | 99.79 | 5.2 | 5.9 |
| Example 4 | 535 | 35.3 | 99.60 | 5.0 | 5.3 |
| Example 5 | 535 | 36.1 | 98.86 | 4.3 | 6.0 |
| Example 6 | 600 | 32.0 | 99.59 | 4.5 | 6.7 |
| Example 7 | 385 | 33.9 | 99.97 | 7.0 | 4.8 |
| Example 8 | 455 | 36.0 | 99.97 | 6.5 | 5.1 |
| Example 9 | 470 | 32.6 | 99.88 | 4.9 | 5.1 |
| Comparative Example 1 | 610 | 30.4 | 89.55 | 2.3 | 7.4 |
| Comparative Example 2 | 595 | 61.8 | 25.59 | 1.2 | 7.8 |
| Comparative Example 3 | 610 | 29.4 | 96.58 | 2.9 | 7.9 |
| Comparative Example 4 | 570 | 20.0 | 85.0 | 2.1 | 8.2 |

Referring to FIGS. 4 to 7 and Table 6, the polarizing films according to Examples 1 to 9 simultaneously satisfy higher light transmittance, better polarization efficiency, and higher dichroic ratio than Comparative Examples 1 to 4.

Specifically, the polarizing films according to Examples 1 to 9 have light transmittance of greater than or equal to about 30.0% and polarization efficiency of greater than or equal to about 90%. On the contrary, the polarizing films according to Comparative Examples 1 to 4 do not simultaneously satisfy light transmittance of greater than or equal to about 30.0% and polarization efficiency of greater than or equal to about 90%. In addition, the films of these comparative examples have low dichroic ratios.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A polarizing film comprising
a polyolefin and
a dichroic dye represented by the Chemical Formula 1,
wherein a solubility parameter difference between the polyolefin and the dichroic dye is less than 7.4:

Chemical Formula 1

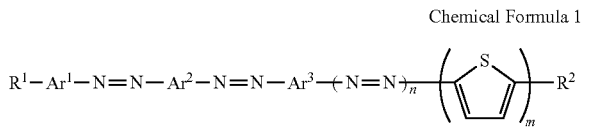

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, a substituted or unsubstituted amino group, —$NR^3R^4$, or a combination thereof, wherein $R^3$ and $R^4$ are each independently hydrogen, a substituted or unsubstituted C1 to C10 alkyl group, or are linked to each other to form a ring, and
n and m are independently 0 or 1.

2. The polarizing film of claim 1, wherein $R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, a substituted or unsubstituted C1 to C20 alkoxy group, a substituted or unsubstituted C1 to C20 thioalkyl group, —$NR^3R^4$, or a combination thereof, wherein $R^3$ and $R^4$ are each independently hydrogen, a substituted or unsubstituted C1 to C10 alkyl group or are linked to each other to form a ring.

3. The polarizing film of claim 1, wherein when each of n and m is 1,
$R^1$ s a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring.

4. The polarizing film of claim 1, wherein when each of n and m is 0,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, —$NR^3R^4$, or a combination thereof, wherein $R^3$ and $R^4$ are each independently hydrogen, a substituted or unsubstituted C1 to C10 alkyl group, or are linked to each other to form a ring.

5. The polarizing film of claim 1, wherein when n is 1 and m is 0,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C30 aryl group, —$NR^3R^4$, or a combination thereof, wherein $R^3$ and $R^4$ are each independently hydrogen, a substituted or unsubstituted C1 to C10 alkyl group, or are linked to each other to form a ring.

6. The polarizing film of claim 5, wherein $R^2$ comprises a substituted or unsubstituted C6 to C30 aryl group.

7. The polarizing film of claim 1, wherein $Ar^1$ to $Ar^3$ are each independently a substituted or unsubstituted phenylene group, a substituted or unsubstituted naphthalene group, or a substituted or unsubstituted biphenylene group.

8. The polarizing film of claim 7, wherein the substituted phenylene group, the substituted naphthalene group, and the substituted biphenylene group are substituted with a substituted or unsubstituted C1 to C20 alkyl group, a substituted or unsubstituted C1 to C20 alkoxy group, a halogen atom, a halogen-containing group, or a combination thereof.

9. The polarizing film of claim 1, wherein
$R^1$ is a substituted or unsubstituted C1 to C20 alkoxy group or a substituted or unsubstituted C1 to C20 thioalkyl group,
$R^2$ is hydrogen or —$NR^3R^4$, wherein $R^3$ and $R^4$ are each independently hydrogen, substituted or unsubstituted C1 to C10 alkyl group, or are linked to each other to form a ring,
m is 1, and
n is 1.

10. The polarizing film of claim 1, wherein
$R^1$ is a substituted or unsubstituted C1 to C20 alkoxy group, a substituted or unsubstituted C1 to C20 thioalkyl group, or a substituted or unsubstituted C1 to C30 alkyl group,
$R^2$ is hydrogen, a substituted or unsubstituted C1 to C30 alkyl group or
—$NR^3R^4$, wherein $R^3$ and $R^4$ are each independently hydrogen, substituted or unsubstituted C1 to C10 alkyl group, or are linked to each other to form a ring,
m is 0, and
n is 0.

11. The polarizing film of claim 1, wherein
$R^1$ is a substituted or unsubstituted C1 to C20 alkoxy group, a substituted or a unsubstituted C1 to C20 thioalkyl group, or a substituted or unsubstituted C1 to C30 alkyl group,
$R^2$ is hydrogen or a substituted or unsubstituted C6 to C30 aryl group,
m is 0, and
n is 1.

12. The polarizing film of claim 1, wherein the polyolefin has a solubility parameter of about 15 to about 18, and
the dichroic dye has a solubility parameter of less than about 24.

13. The polarizing film of claim 1, wherein the polyolefin comprises polyethylene, polypropylene, a polyethylene-polypropylene copolymer, or a combination thereof.

14. The polarizing film of claim 13, wherein the polyolefin is a combination comprising polypropylene and a polyethylene-polypropylene copolymer, and
the polyethylene-polypropylene copolymer has an ethylene content of about 1 to about 50 wt %.

15. The polarizing film of claim 14, wherein the polyolefin has a melt flow index of about 1 g/10 min to about 15 g/10 min.

16. The polarizing film of claim 1, wherein the dichroic dye is present in an amount of about 0.01 to about 5 parts by weight based on 100 parts by weight of the polyolefin.

17. The polarizing film of claim 16, wherein the dichroic dye is present in an amount of about 0.05 to about 1 part by weight based on 100 parts by weight of the polyolefin.

18. The polarizing film of claim 1, wherein the polarizing film has a dichroic ratio of about 3 to about 10 in a visible wavelength region of about 380 nm to about 780 nm.

19. The polarizing film of claim 1, wherein the polarizing film is a melt-blend of the polyolefin and the dichroic dye.

20. The polarizing film of claim 19, wherein the dichroic dye is dispersed in the polyolefin resin, and
the film is elongated in a uniaxial direction by about 400 to about 1000%.

21. A display device comprising the polarizing film of claim 1.

22. The display device of claim 21, wherein the device is a liquid crystal display device or an organic light emitting diode display device.

23. A composition for a polarizing film, comprising
a polyolefin, and
the dichroic dye represented by Chemical Formula 1,
wherein a solubility parameter difference between the polyolefin and the dichroic dye is less than 7.4:

Chemical Formula 1

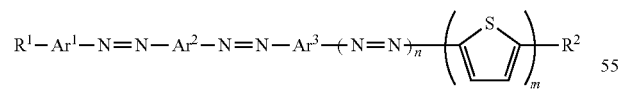

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C1 to C30 hetero aromatic group, a substituted or unsubstituted amino group, $-NR^3R^4$, or a combination thereof, wherein $R^3$ and $R^4$ are each independently hydrogen, a substituted or unsubstituted C1 to C10 alkyl group, or are linked to each other to form a ring, and
n and m are independently 0 or 1.

24. The composition of claim 23, wherein the polyolefin has a melting point of less than or equal to 300° C.

25. The composition of claim 23, wherein the polyolefin is a mixture of polypropylene and a polyethylene-polypropylene copolymer.

26. The composition of claim 25, wherein the polyolefin has a melt flow index of about 1 g/10 min to about 15 g/10 min.

27. The composition of claim 25, wherein the polypropylene has a melt flow index of about 0.1 g/10 min to about 5 g/10 min, and
the polyethylene-polypropylene copolymer has a melt flow index of about 5 g/10 min to about 15 g/10 min.

28. The composition of claim 23, wherein the composition has a solid content of greater than or equal to about 90 wt %.

29. The composition of claim 23, wherein the composition does not comprise a solvent.

30. A method of manufacture of a polarizing film, the method comprising:
melt-blending the composition of claim 23;
forming a sheet from the melt-blended composition; and
elongating the sheet in a uniaxial direction to provide the polarizing film.

31. A polarizing film comprising
a transparent polymer having a melting point of higher than or equal to about 130° C., and
a dichroic dye represented by the Chemical Formula 1,
wherein a solubility parameter difference between the dichroic dye and the polyolefin, the polyethylene terephthalate or a combination thereof is less than 7.4:

Chemical Formula 1

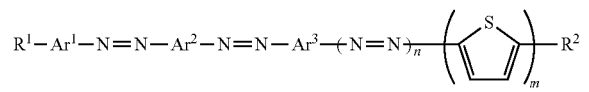

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 heteroaliphatic group, a substituted or unsubstituted C1 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 heteroaliphatic group, a substituted or unsubstituted C1 to C30 hetero aromatic group, a substituted or unsubstituted amino group, $-NR^3R^4$, or a combination thereof, wherein $R^3$ and $R^4$ are each independently hydrogen, a substituted or unsubstituted C1 to C10 alkyl group, or are linked to each other to form a ring, and n and m are independently 0 or 1.

32. The polarizing film of claim 31, wherein the transparent polymer has an average light transmittance ratio of greater than or equal to about 85% in a visible ray wavelength region and a crystallinity of about 20% to about 60%.

* * * * *